US012732590B2

(12) United States Patent
Azuma et al.

(10) Patent No.: US 12,732,590 B2
(45) Date of Patent: Sep. 8, 2026

(54) METHODS AND APPARATUS TO PROVIDE REMOTE TELEPRESENCE COMMUNICATION

(71) Applicant: Intel Corporation, Santa Clara, CA (US)

(72) Inventors: Ronald Azuma, San Jose, CA (US); Joshua Ratcliff, San Jose, CA (US); Santiago Alfaro, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 18/252,327

(22) PCT Filed: Nov. 22, 2021

(86) PCT No.: PCT/US2021/060353

§ 371 (c)(1),
(2) Date: May 9, 2023

(87) PCT Pub. No.: WO2022/115380

PCT Pub. Date: Jun. 2, 2022

(65) Prior Publication Data

US 2024/0015263 A1 Jan. 11, 2024

Related U.S. Application Data

(60) Provisional application No. 63/119,438, filed on Nov. 30, 2020.

(51) Int. Cl.

*H04N 7/15* (2006.01)
*G06T 11/60* (2026.01)
*G06T 15/50* (2011.01)

(52) U.S. Cl.

CPC ............. *H04N 7/157* (2013.01); *G06T 11/60* (2013.01); *G06T 15/50* (2013.01); *G06T 2215/12* (2013.01)

(58) Field of Classification Search

CPC ......... H04N 7/157; G06T 11/60; G06T 15/50; G06T 2215/12

(Continued)

(56) References Cited

U.S. PATENT DOCUMENTS 10,565,734 B2 * 2/2020 Bevensee ................ G06T 7/521
2014/0313277 A1 * 10/2014 Yarosh .................. H04N 7/144 348/14.08

(Continued)

FOREIGN PATENT DOCUMENTS

KR 20160086226 A 7/2016
KR 20170059310 A 5/2017

(Continued)

OTHER PUBLICATIONS

International Searching Authority, "International Search Report," issued in connection with International Patent Application No. PCT/US2021/060353, dated Mar. 17, 2022, 3 Pages.

(Continued)

*Primary Examiner* — Binh Kien Tieu
(74) *Attorney, Agent, or Firm* — Hanley, Flight & Zimmerman, LLC

(57) ABSTRACT

Methods, apparatus, systems, and articles of manufacture are disclosed to provide remote telepresence communication. At least one non-transitory machine-readable medium comprises instructions that, when executed, cause a processor to identify features from a plurality of images, the plurality of images representing a first user and a second user, create a first representation of the first user, a second representation of the second user, the representations created using the plurality of images, the representations representing the respective users at specified distances and specified perspectives from a viewer, and construct a first image, the first image including the second model at a specified loca- (Continued)

tion within a shared environment, the first image to be presented on a first display.

18 Claims, 16 Drawing Sheets

(58) Field of Classification Search
USPC .......................................................... 348/14.08
See application file for complete search history.

(56) References Cited

U.S. PATENT DOCUMENTS

| | | | | |
|---|---|---|---|---|
| 2016/0205352 | A1 | 7/2016 | Lee | |
| 2018/0374242 | A1 | 12/2018 | Li et al. | |
| 2020/0117270 | A1* | 4/2020 | Gibson | G06F 3/011 |
| 2020/0349751 | A1* | 11/2020 | Bentovim | G09B 5/06 |
| 2021/0082185 | A1* | 3/2021 | Ziegler | G06T 15/50 |
| 2022/0020128 | A1* | 1/2022 | Roy | G06T 5/94 |
| 2022/0292762 | A1* | 9/2022 | Boubekeur | G06T 11/10 |
| 2022/0368969 | A1* | 11/2022 | Sheppard | G06Q 30/0246 |
| 2024/0015263 | A1* | 1/2024 | Azuma | G06T 15/50 |

FOREIGN PATENT DOCUMENTS

| | | |
|---|---|---|
| KR | 20170093451 A | 8/2017 |
| KR | 20180062045 A | 6/2018 |

OTHER PUBLICATIONS

International Searching Authority, "Written Opinion of the International Searching Authority," issued in connection with International Patent Application No. PCT/US2021/060353, dated Mar. 17, 2022, 5 Pages.
International Searching Authority, "International Preliminary Report on Patentability," issued in connection with International Patent Application No. PCT/US2021/060353, dated Jun. 15, 2023, 7 pages.
Raskar, et al., "The Office of the Future: A Unified Approach to Image-Based Modeling and Spatially Immersive Displays", SIGGRAPH 98, Computer Graphics Proceedings, Annual Conference Series, 1998, published Jul. 19-24, 1998, 10 pages.
Jones et al., "Achieving eye contact in a one-to-many 3D video teleconferencing system", ACM Trans. Graph. vol. 28, Issue 3, Article No. 64, published Jul. 27, 2009, 7 pages.
Fried et al., "Perspective-aware manipulation of portrait photos", ACM Transactions on Graphics (TOG), vol. 35, Issue 4, Article No. 128, published Jul. 11, 2016, 5 pages.
Orts-Escolano et al., "Holoportation: Virtual 3D Teleportation in Real-Time", Microsoft Research, UIST 2016, published Oct. 16-19, 2016, 14 pages.
Wei et al., "VR Facial Animation via Multiview Image Translation", Facebook Reality Labs, ACM Trans. Graph., vol. 38, No. 4, Article 67, published Jul. 2019, 16 pages.
Shih et al., "Distortion-Free Wide-Angle Portraits on Camera Phones", Google, ACM Trans. Graph., vol. 38, No. 4, Article 61, published Jul. 2019, 12 pages.
Zhang et al., "Portrait Shadow Manipulation", ACM Trans. Graph., vol. 39, No. 4, Article 78, published Jul. 2020, 14 pages.
Ray, S., "Video fatigue and a late-night host with no audience inspire a new way to help people feel together, remotely", Microsoft, Work & Life, published Jul. 8, 2020, 12 pages.
Bailenson, Jeremy N., "Nonverbal Overload: A Theoretical Argument for the Causes of Zoom Fatigue", American Psychological Association, Technology, Mind, and Behavior, published 2021, 6 pages.
Bavor, C., "Project Starline: Feel like you're there, together", Google Research, Retrieved from: https://blog.google/technology/research/project-starline/, published May 18, 2021, 3 pages.
Lombardi et al., "Mixture of Volumetric Primitives for Efficient Neural Rendering", Facebook Reality Labs, ACM Trans. Graph., vol. 40, No. 4, Article 59, published Aug. 2021, 13 pages.
Pandey et al., "Total Relighting: Learning to Relight Portraits for Background Replacement", Google Research, ACM Trans. Graph., vol. 40, No. 4, Article 43, published Aug. 2021, 21 pages.
Cutter, C., "Remote work may now last for two years, worrying some bosses," The Wall Street Journal, published Aug. 22, 2021, 6 pages.
Meta Quest, "Introducing Horizon Workrooms: Remote Collaboration Reimagined", Meta, Retrieved from: https://www.meta.com/en-gb/blog/workrooms/, last updated Dec. 6, 2023, 10 pages.

* cited by examiner

METHODS AND APPARATUS TO PROVIDE REMOTE TELEPRESENCE COMMUNICATION

RELATED APPLICATIONS

This patent arises from the national stage of International Application No. PCT/US2021/060353, which was filed on Nov. 22, 2021, which claims the benefit of U.S. Provisional Patent Application Ser. No. 63/119,438, which was filed on Nov. 30, 2020. International Application No. PCT/US2021/060353 and U.S. Provisional Patent Application No. 63/119,438 are hereby incorporated herein by reference in its entirety. Priority to International Application No. PCT/US2021/060353 and U.S. Provisional Patent Application No. 63/119,438 are hereby claimed.

FIELD OF THE DISCLOSURE

This disclosure relates generally to video conferencing and, more particularly, to methods and apparatus to provide augmented telepresence communication.

BACKGROUND

In recent years, growing desires to work, learn, and generally communicate with others remotely have led to an increased use of video conferencing programs. Video conferencing programs seek to emulate in-person communication by bringing two or more users into a virtual environment. Audio and/or visual data of a given user in the virtual environment is shared over a network with the other users in the virtual environment, enabling communication between the users.

BRIEF DESCRIPTION OF THE DRAWINGS

In general, the same reference numbers will be used throughout the drawing(s) and accompanying written description to refer to the same or like parts. The figures are not to scale.

Figure 1:
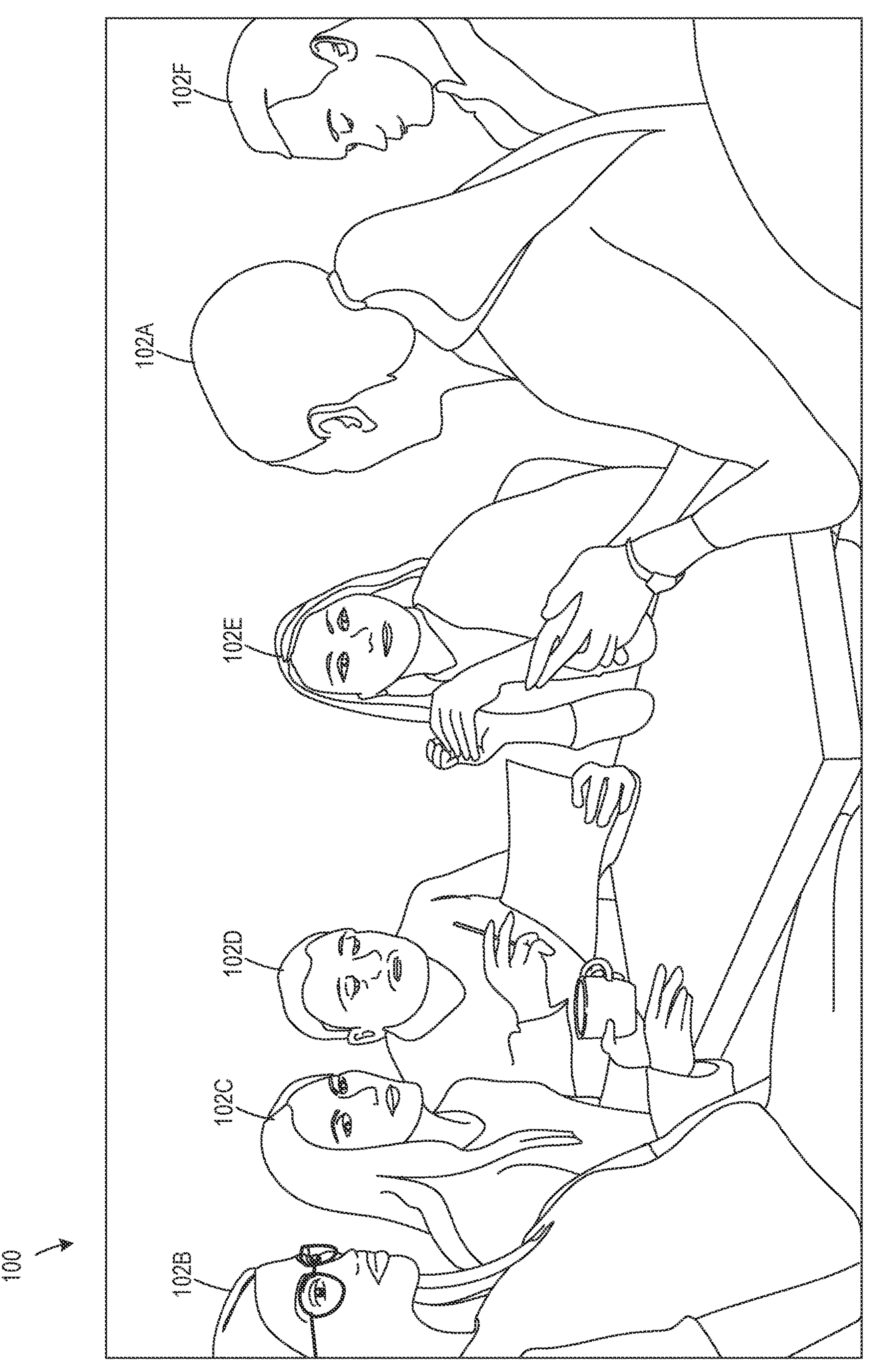
FIG. 1 is an illustration of in-person communication.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In many use cases, the goal of video conferencing programs is to emulate in-person communication. In-person communication has several advantages, including but not limited to realism, directionality, and social cues. An example of in-person communication is explored further in FIG. 1.

Many previous solutions exist to emulate in-person communication. Some such video conferencing programs may enable remote communication between users, but fail to provide the combination of realism, directionality, and social cues experienced during in-person communication. In some examples, extended use of video conferencing programs may negatively affect the mental and/or emotional health of users.

Some previous solutions attempt to provide a combination of realism, directionality, and social cues while emulating in-person communication. In doing so, these solutions introduce additional challenges such as difficulties with implementation, cost, and lack of security. Previous solutions to emulate in-person communication are explored further in FIGS. 2 and 3.

The methods and apparatus to provide remote telepresence communication in the teachings of this disclosure emulate in-person communication while also providing realism, directionality, and social cues. The teachings of this disclosure achieve this communication while avoiding or mitigating the additional challenges seen in previous solutions.

In the example remote telepresence communication system of this disclosure, a group of users seek to communicate remotely with one another. A camera array is used to capture a subset of the example user's light field from a plurality of views. As used herein, a light field refers to all the rays of light emitted in all directions from a real object or scene. As used herein, a view refers to a particular perspective that a camera or user may have. For example, plurality of views from the camera array comes from the plurality of cameras that compose the camera array, where each camera has a single view or perspective.

The subset of the light field captured by the camera array of the example user is sent as a plurality of images over a network to the example telepresence circuitry. In the teachings of this disclosure, a single image in the plurality of images represents a single frame of a video, where each of the plurality of cameras in an example camera array records a video. Similarly, the camera array circuitry of each user sends a plurality of images of the respective user over a network to the example telepresence circuitry. Features that describe a combined plurality of images of all users are used as inputs to example multi-view relighter circuitry, which lights the group of users consistently in a shared environment.

The combined plurality of images are further modified by example social view synthesis circuitry, which projects the users at specified distances within the shared environment. The social view synthesis circuitry also removes the distortion that occurs due to the proximity between a user and their camera array. The social view synthesis circuitry creates a user representation of each user using the modified combined plurality of images and places the user representations within the shared environment.

View constructor circuitry constructs a new image of the user representations within the shared environment. A new image is constructed for each user at a view that maintains directionality between the users. New images are constructed for each frame recorded by the camera arrays, resulting in a new video for each user. Data provider circuitry provides the frames to the users' displays, which renders the frames as a video containing of users in the shared environment. Each video is unique to the user that receives it, resulting in a remote telepresence communication between users that has realism, directionality, and social context.

FIG. 1 is an illustration of in-person communication. The illustration 100 shows a meeting between a group of people, 102A-102F.

The in-person communication of FIG. 1 exhibits multiple advantage over other forms of communication. For example, the people 102A-102F in the illustration 100 are seated around a table. As a result, when a person speaks, other participants may make eye contact with the speaker, turn to directly face the speaker, make note of the speaker's facial expressions, etc. This directionality and social context allows an example person to communicate both verbally and non-verbally with any or all other participants due to the positioning around the table. As used herein, directionality refers to the positioning of an individual within an environment relative to the position of others within the environment. As used herein, social context refers to the set of cues or actions that individual use to communicate nonverbally. Examples of social context include but are not limited to analyzing an individual's facial expression to predict their mood or attitude, making eye contact to indicate attentiveness, etc.

Directionality and social context provide information that is typically not communicated verbally. For example, body posture in the illustration 100 may be used to determine that the first person 102A is speaking. Additionally, eye contact may be used to determine that the second person 102B, third person 102C, and fifth person 102E are actively listening to the first person 102A. Further, eye contact may be used to determine that the fourth person 102D and the sixth person 102F are distracted and may not be actively listening. The nonverbal communication provided by directionality and social context may play a critical role in the effectiveness of the meeting displayed in the illustration 100.

Figure 2:
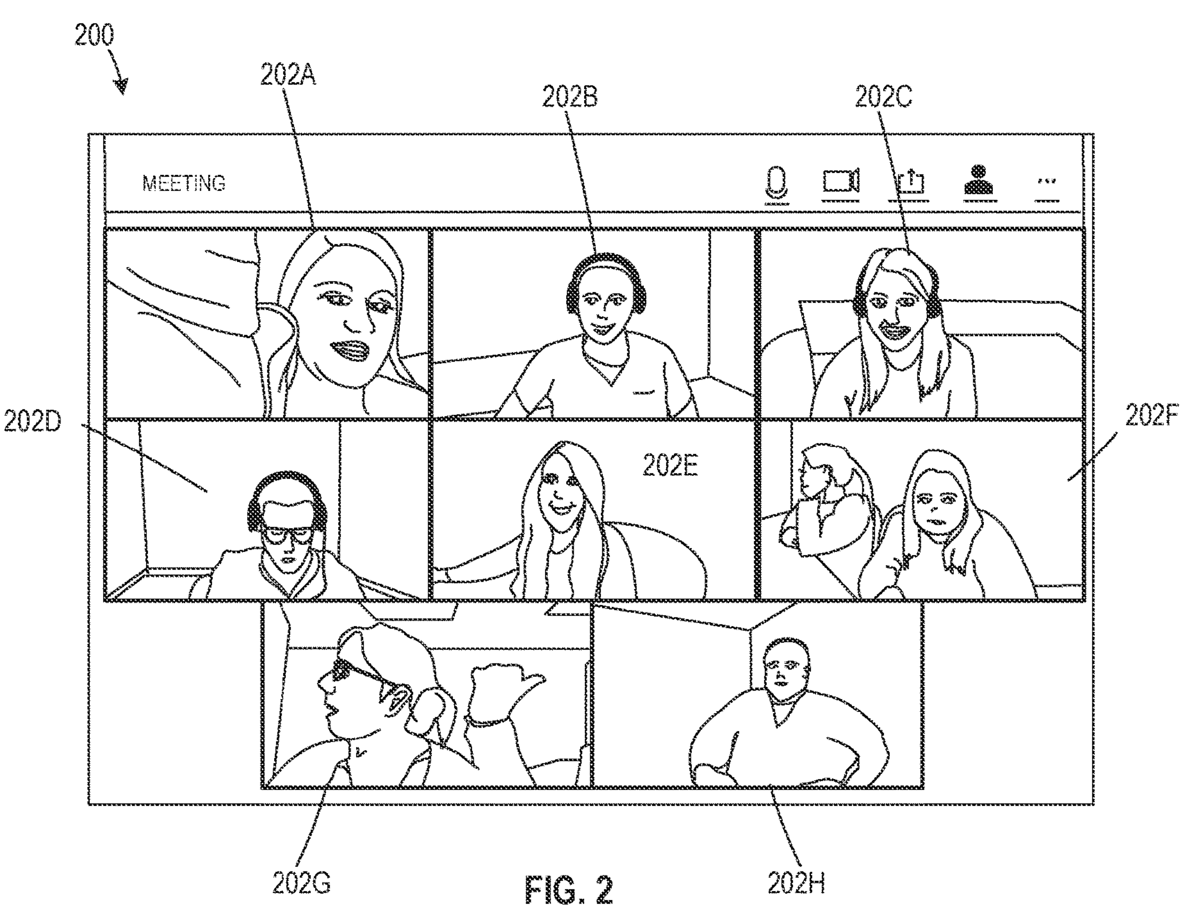
FIG. 2 is an illustration of a first previous solution for video conferencing.

FIG. 2 is an illustration of a first previous solution for video conferencing. The illustration 200 includes multiple users 202A-202H, who seek to communicate remotely.

The illustration 200 of FIG. 2 represents an example window generated by the first previous solution. Each of the multiple users 202A-202H have a camera and a microphone, which generate a video feed and audio feed, respectively. The multiple video feeds are arranged in a grid format within the example window. Additionally, video feeds may be highlighted or outlined to visually indicate when a particular user is speaking.

The first previous solution of FIG. 2 enables verbal communication between the multiple users 202A-202H. However, the first previous solution lacks the directionality and social context provided by in-person communication. For example, when a given user 202A views the example window, the other viewers are placed arbitrarily within the grid format. As a result, is it difficult to determine whether the speaker, user 202C, is speaking to a particular user, a subset of the users, or all of the multiple users 202A-202H. Additionally, it is difficult for the given user to indicate they are attentively listening, as their body position and eye contact used to view the grid format do not indicate whether they are looking at the speaker, user 202C, or another user. Further, it would be difficult for one user 202D to communicate with another user 202E nonverbally, as any gesture such as a change in facial expression or body posture would be positioned arbitrarily in the grid format, making it challenging for the multiple users 202A-202H to notice the gestures and determine who the gestures were intended for. The lack of directionality and social context in the illustration 200 may limit the quality of communication amongst the multiple users 202A-202H.

Figure 3:
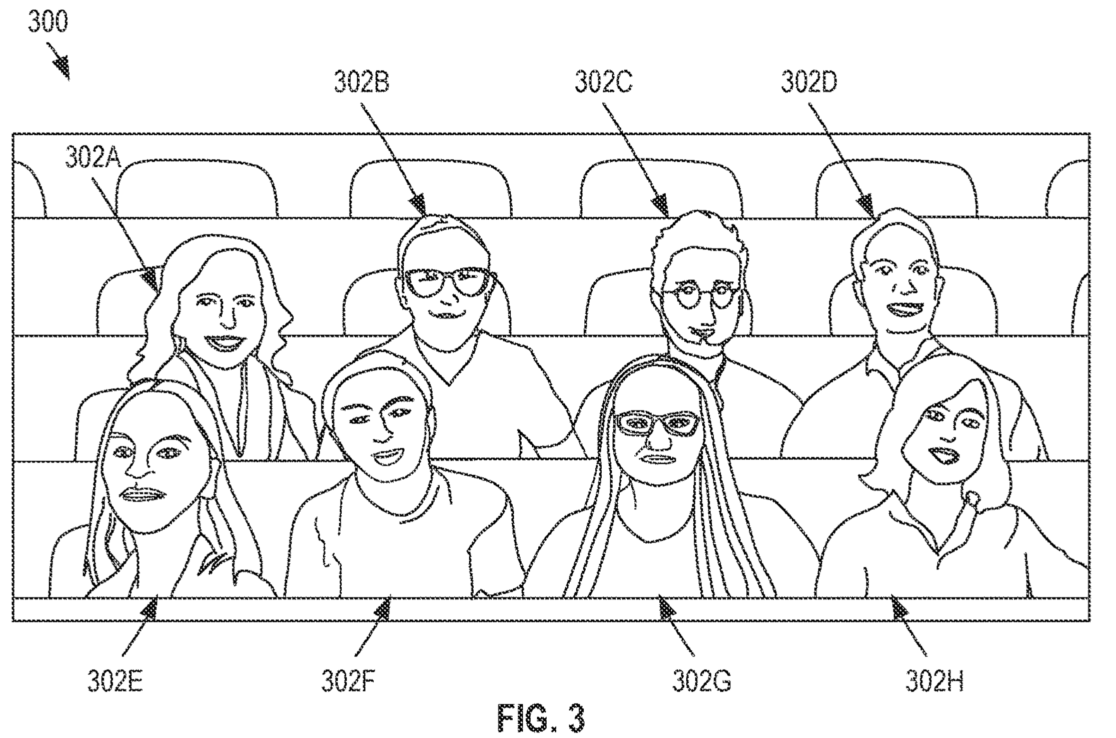
FIG. 3 is an illustration of a second previous solution for video conferencing.

FIG. 3 is an illustration of a second previous solution for video conferencing. The illustration 300 includes multiple users 302A-302H, who seek to communicate remotely.

The illustration 300 of FIG. 3 represents an example window generated by the second previous solution. Like the first previous solution of FIG. 2, each of the multiple users 302A-302H use a camera and a microphone to generate a video and audio feed. In the second previous solution, a subset of the video feeds representing the multiple users 302A-302H and excluding their separate background are identified. The subset of the video feeds are placed in a shared environment within the example window. In the illustration 300, the shared environment represents a lecture hall.

The second previous solution enables verbal communication between the multiple users 302A-302H. The shared environment may also provide an increased sense of realism for some users. However, the second previous solution faces the same challenges regarding directionality and social context as described previously. These challenges arise from the fact that the multiple users 302A-302H are placed arbitrarily within the shared environment, so a given user 302A would struggle to direct any form of nonverbal communication towards an intended recipient, user 302B. The lack of directionality and social context in the illustration 300 may limit the quality of communication amongst the multiple users 302A-302H.

In some examples, individuals who communicate remotely using video conferencing programs such as those described in FIG. 2 and FIG. 3 may experience negative affects to their mental and/or emotional health. Research into the effects of current video conferencing programs indicate that users may experience these negative effects due to the intense experience of seeing excessive amounts of eye contact seen in the grid format of video feeds, and from reduced mobility of looking straightforward for extended periods of time.

Other previous solutions provide alternative methods to communicate remotely. In some examples, users may wear a virtual reality headset and accompanying equipment. In some such examples, users are represented by an avatar in a shared environment. An avatar may mimic the movements of a user based on input from the headset and accompanying equipment. Therefore, some such examples may achieve directionality while enabling verbal communication. However, these solutions lack realism and social context. Some users may find the avatars cartoon like, which reduces the sense of realism. Moreover, the avatars of some such examples are unable to convey facial expressions and other non-verbal cues from the users.

Some effort has been made to improve upon previous solutions utilizing virtual reality. In some example improvements, photo-realistic avatars are generated to replace the cartoon-like avatars. To generate photo-realistic avatars, users are required to be recorded in capture systems that may be large, expensive to construct, and unavailable to scale for consumers. Furthermore, the creation of photo-realistic avatars may raise concerns over Internet security, as a user would be uncertain what their likeness may be used for in the future.

Figure 4:
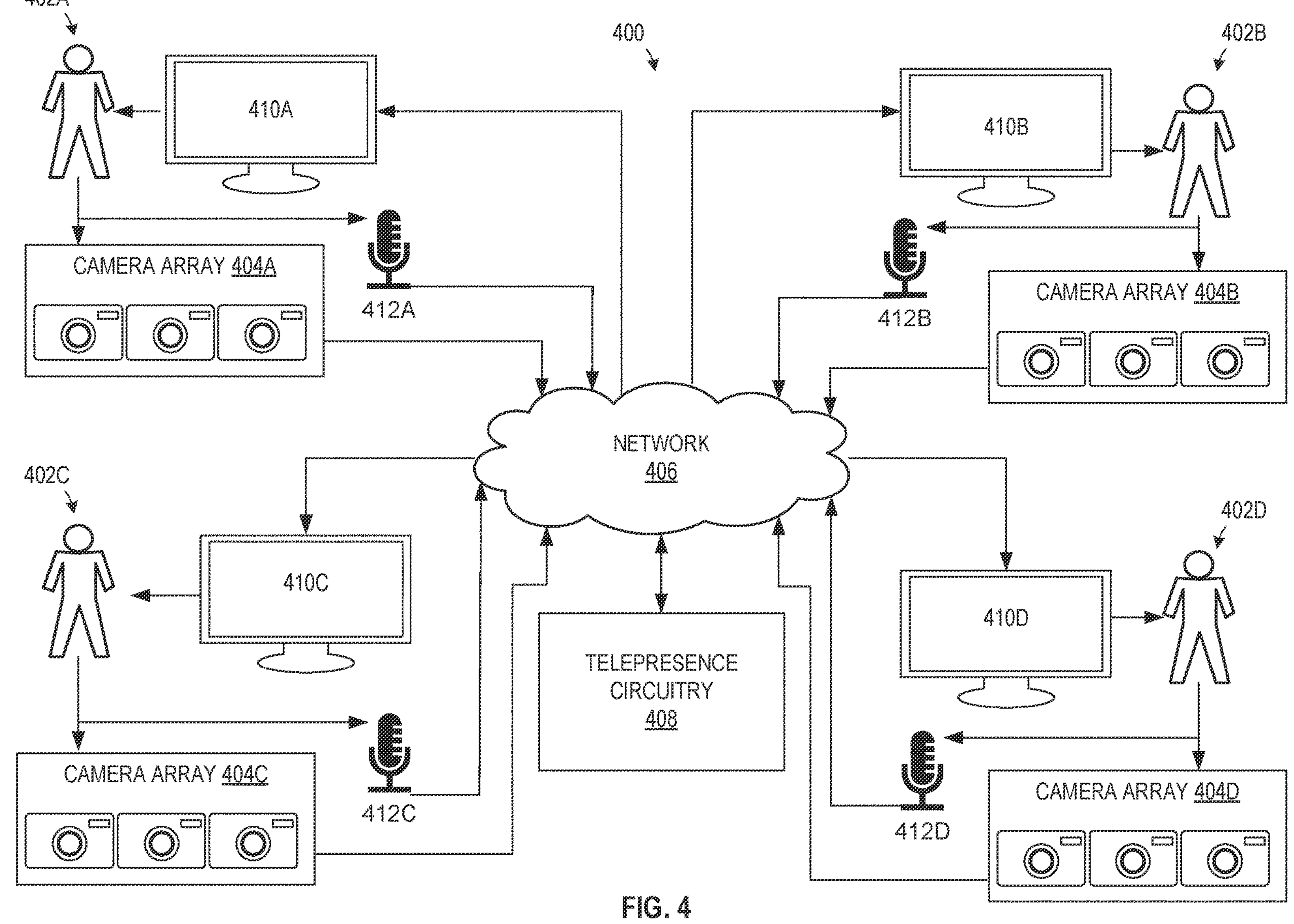
FIG. 4 is a block diagram of an example system to provide augmented telepresence communication.

FIG. 4 is a block diagram of an example system to provide augmented telepresence communication. The example system 400 includes users 402A, 402B, 402C, and 402D, example camera arrays 404A, 404B, 404C, and 404D, network 406, example telepresence circuitry 408, displays 410A, 410B, 410C, and 410D, and microphones 412A, 412B, 412C, and 412D.

The users 402 are individuals who seek to communicate remotely with one another. The users 402 may have any reason to communicate. In the example system 400, the example telepresence circuitry 408 supports video conferencing with four users 402. In some example systems, the example telepresence circuitry 408 may support any number of users.

The example camera arrays 404 capture a subset of the example user's light field from a plurality of views. The subset of the example user's light field is captured as a plurality of images. The plurality of images represent individual frames from a plurality of videos, where each of the cameras that compose a given camera array 404A records a video. The example camera arrays 404 provide the plurality of images to the example telepresence circuitry 408 via the network 406. The users 402 in the example system 400 utilize respective example camera arrays 404. For example, camera array 404A provides images of user 402A, camera array 404B provides images of user 402B, etc.

The microphones 412 of FIG. 4 record audio data included in the video feed. In the example system 400, the microphones 412 are independent devices. In other examples, some or all of the microphones 412 may be integrated within a device such as a laptop or an example camera array 404A.

An example camera array 404A may provide camera parameters to the example telepresence circuitry 408 via the network 406. The camera parameters may describe the focal length of one or more cameras within the camera array 404A, as well as the orientation and relative position of one or more cameras within the camera array 404A. The camera parameters may be pre-calibrated during the manufacture of the camera array 404A. The camera parameters may remain constant for a given camera array 404A. The example camera arrays 404 are explored further in FIG. 7.

The network 406 of FIG. 4 connects and facilitates communication between the example camera arrays 404, the example telepresence circuitry 408, and the displays 410. In this example, the network 406 is the Internet. However, the network 406 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example telepresence circuitry 408 receives video feeds from the respective users 402 via the network 406. The example telepresence circuitry 408 extracts the subset of the video feed that represents the users 402 and relights the subsets in a shared environment. The example telepresence circuitry 408 places the users 402 within the shared environment at a specified distance and orientation from one another. The example telepresence circuitry 408 is explored further in FIG. 5.

The displays 410 access and present a video feed. The video feed is provided by the example telepresence circuitry 408 via the network 406. The displays 410 may be implemented by any device used to present visual data. Example implementations of a display 410A include but are not limited to computer monitors such as a laptop screen or one or more external monitors, an augmented reality headset, etc. While not illustrated in FIG. 4, the example system 400 also includes speakers to play audio data included in the video feeds. In some examples, the speakers may be integrated within a display 410A. In other examples, the speakers may be independent devices.

The video feed provided to display 410A by the example telepresence circuitry 408 via the network 406 does not match the video feed provided to display 410B. Rather, the display 410A shows a video feed of users 402B, 402C, and 402D, depicting the shared environment from the perspective of user 402A. Similarly, the display 410B shows a video feed of users 402A, 402C, and 402D, depicting the shared environment from the perspective of user 402B. By creating the video feeds with the same relative positions between users, the example telepresence circuitry 408 enables the users 402 to communicate with the combination of realism, directionality, and social context that previous solutions lack.

Figure 5:
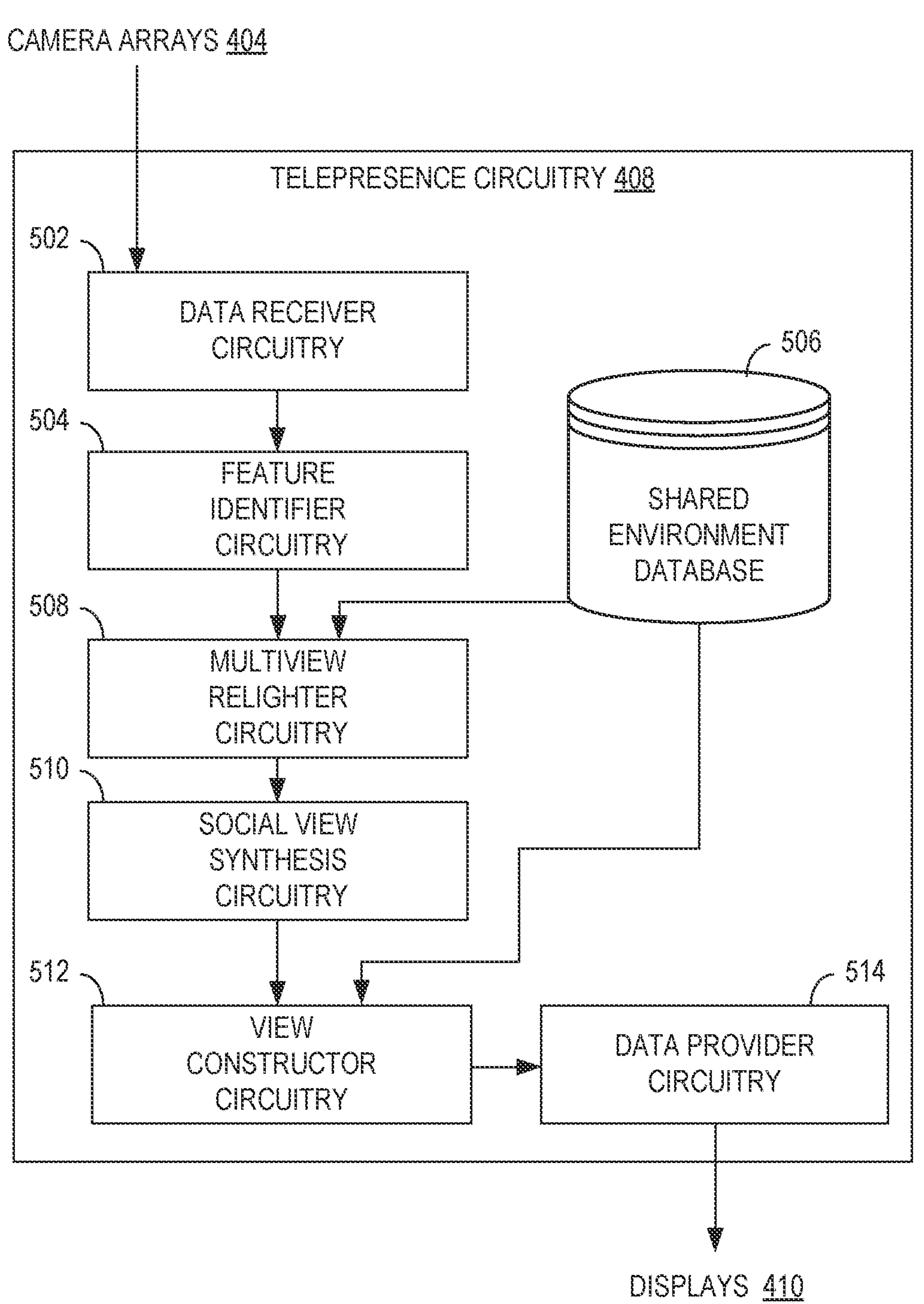
FIG. 5 is a block diagram of an example implementation of the telepresence circuitry of FIG. 4.

FIG. 5 is a block diagram of an example implementation of example telepresence circuitry to provide remote telepresence communication. The example telepresence circuitry 408 of FIG. 5 may be instantiated (e.g., creating an instance of, bring into being for any length of time, materialize, implement, etc.) by processor circuitry such as a central processing unit executing instructions. Additionally or alternatively, the example telepresence circuitry 408 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by one or more virtual machines and/or containers executing on the microprocessor.

The example telepresence circuitry 408 of FIG. 5 includes example data receiver circuitry 502, example feature identifier circuitry 504, an example shared environment database 506, example multi-view relighter circuitry 508, example social view synthesis circuitry 510, example view constructor circuitry 512, and data provider circuitry 514.

The example data receiver circuitry 502 of FIG. 5 receives multiple pluralities of images provided by the camera arrays 404 via the network 406. A given plurality of images represent individual frames of a plurality of videos, where the plurality of videos record a given user from a plurality of views as they communicate. In some examples, the plurality of images are encoded for transmission over the network 406. In some such examples, the example data receiver circuitry 502 decodes the plurality of images and provides the underlying data to the example feature identifier circuitry 504.

The example feature identifier circuitry 504 of FIG. 5 uses the multiple pluralities of images from example data receiver circuitry 502 to identify features representing the users 402. The features include depth maps, foreground extraction, and temporal flow maps.

The example feature identifier circuitry 504 identifies a depth map for the plurality of images representing a given user 402A. A depth map is information relating to the distance of the surfaces of objects in a scene from a viewpoint. The example feature identifier circuitry 504 identifies a given depth map by calculating disparity maps for the plurality of images representing the given user 402A. A disparity map is information relating to apparent pixel difference or motion between images.

The example feature identifier circuitry 504 identifies foregrounds for the plurality of images representing a given user 402A. A foreground of an image represents the portion of the image that represents the subject or focus of the image. The foreground is extracted from the background, which contains the physical environment where the users 402 are located.

The example feature identifier circuitry 504 identifies temporal flow maps from multiple plurality of images, where each plurality of images represents a given user 402A. A temporal flow map describes the velocity of each pixel of videos from [time=t−k to time=t], where k is the length of the desired video history. In some examples, a temporal flow map is generated for each video frame of each camera.

In some examples, the example feature identifier circuitry 504 is composed of multiple machines or processors that identify depth maps, foregrounds, and temporal flow maps in parallel. In an alternative example, the example feature identifier circuitry 504 identifies features sequentially. The example feature identifier circuitry 504 provides the features to the example multi-view relighter circuitry 508.

In some examples, the example telepresence circuitry 408 includes means for identifying features. For example, the means for identifying may be implemented by example feature identifier circuitry 504. In some examples, the example feature identifier circuitry 504 may be instantiated by processor circuitry such as the example processor circuitry 1612 of FIG. 16. For instance, the example feature identifier circuitry 504 may be instantiated by the example general purpose processor circuitry 1700 of FIG. 17 executing machine executable instructions such as that implemented by at least blocks 1106 of FIG. 11. In some examples, the example feature identifier circuitry 504 may be instantiated by hardware logic circuitry, which may be implemented by an ASIC or the FPGA circuitry 1800 of FIG. 18 structured to perform operations corresponding to the machine readable instructions. Additionally or alternatively, the example feature identifier circuitry 504 may be instantiated by any other combination of hardware, software, and/or firmware. For example, the example feature identifier circuitry 504 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example shared environment database 506 of FIG. 5 stores data representing the shared environment through which the users 402 communicate. The example shared environment database 506 may contain a light map. A light map is a data structure used to provide lighting effects to objects within a scene. The example shared environment database 506 may be a panoramic, high dynamic range (HDR) light map. The example shared environment database 506 may also contain one or more data structures to represent the room within a three dimensional (3D) modeling program or 3D rendering software program.

The example shared environment database 506 is implemented by any memory, storage device and/or storage disc for storing data such as, for example, flash memory, magnetic media, optical media, solid state memory, hard drive(s), thumb drive(s), etc. Furthermore, the data stored in the example shared environment database 506 may be in any data format such as, for example, binary data, comma delimited data, tab delimited data, structured query language (SQL) structures, etc. While, in the illustrated example, the example shared environment database 506 is illustrated as a single device, the example shared environment database 506 and/or any other data storage devices described herein may be implemented by any number and/or type(s) of memories.

The example multi-view relighter circuitry 508 of FIG. 5 uses the shared environment database 506 to relight the plurality of images. The plurality of images are relit so that the users 402 appear to be in the same shared environment with the same light sources. In some examples, one or more of the relit plurality of images may be alpha transparent. In the teachings of this disclosure, alpha transparency refers to the ability for parts of an image to appear partially or fully transparent within the image. The example multi-view relighter circuitry 508 is explored further in FIGS. 10 and 11.

In some examples, the example telepresence circuitry 408 includes means for relighting a plurality of images in a shared environment. For example, the means for relighting may be implemented by example multi-view relighter circuitry 508. In some examples, the example multi-view relighter circuitry 508 may be instantiated by processor circuitry such as the example processor circuitry 1612 of FIG. 16. For instance, example multi-view relighter circuitry 508 may be instantiated by the example general purpose processor circuitry 1700 of FIG. 17 executing machine executable instructions such as that implemented by at least blocks 1102-1120, 1202-1214 of FIGS. 11 and 12. In some examples, the example multi-view relighter circuitry 508 may be instantiated by hardware logic circuitry, which may be implemented by an ASIC or the FPGA circuitry 1800 of FIG. 18 structured to perform operations corresponding to the machine readable instructions. Additionally or alternatively, the example multi-view relighter circuitry 508 may be instantiated by any other combination of hardware, software, and/or firmware. For example, the example multi-view relighter circuitry 508 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example social view synthesis circuitry 510 of FIG. 5 uses the relit plurality of images to create user representations for each of the users 402. The example social view synthesis circuitry 510 reprojects images onto the user representations to make users appear at specified distances and perspectives. The user representation may be a three dimensional model or a two dimensional image. In some examples, the social view synthesis circuitry may determine whether the user representation is a three dimensional or two dimensional image based on the type and computational resources of the displays 410. The example social view synthesis circuitry 510 is explored further in FIGS. 8 and 12.

In some examples, the example telepresence circuitry 408 includes means for creating user representations to represent users at specified distances and perspectives from a viewer. For example, the means for creating may be implemented by example social view synthesis circuitry 510. In some examples, the example social view synthesis circuitry 510 may be instantiated by processor circuitry such as the example processor circuitry 1612 of FIG. 16. For instance, example social view synthesis circuitry 510 may be instantiated by the example general purpose processor circuitry 1700 of FIG. 17 executing machine executable instructions such as that implemented by at least blocks 1302-1320, 1402-1416 of FIGS. 13 and 14. In some examples, the example social view synthesis circuitry 510 may be instantiated by hardware logic circuitry, which may be implemented by an ASIC or the FPGA circuitry 1800 of FIG. 18 structured to perform operations corresponding to the machine readable instructions. Additionally or alternatively, the example social view synthesis circuitry 510 may be instantiated by any other combination of hardware, software, and/or firmware. For example, the example social view synthesis circuitry 510 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example view constructor circuitry 512 of FIG. 5 constructs a new image for each of the users 402 using the user representations generated by the example social view synthesis circuitry 510. The new image for a given user 402A shows the user representations of the other users 402B, 402C, 402D at specified locations within the shared environment. The example view constructor circuitry 512 places the user representations within the shared environment using the example shared environment database 506. An example new image is explored further in FIG. 10.

In some examples, the example telepresence circuitry 408 includes means for constructing a view. For example, the means for constructing may be implemented by example view constructor circuitry 512. In some examples, the example view constructor circuitry 512 may be implemented by machine executable instructions such as that implemented by at least blocks 1502-1510, 1514 of FIG. 15 executed by processor circuitry, which may be implemented by the example processor circuitry 1612 of FIG. 16, the example processor circuitry 1700 of FIG. 17, and/or the example Field Programmable Gate Array (FPGA) circuitry 1800 of FIG. 18. In other examples, the example view constructor circuitry 512 is implemented by other hardware logic circuitry, hardware implemented state machines, and/or any other combination of hardware, software, and/or firmware. For example, the example view constructor circuitry 512 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example data provider circuitry 514 of FIG. 5 provides the new image constructed by the example view constructor circuitry 512 to the respective displays 410. For example, the example data provider circuitry 514 of FIG. 5 provides a new image from the perspective of user 402A to display 410A. The example data provider circuitry 514 also provides audio data received by the camera arrays to speakers via the network 406. The example data provider circuitry 514 may additionally encode the new images for transmission over the network 406.

In some examples, the example telepresence circuitry 408 includes means for providing images to a display. For example, the means for providing may be implemented by example data provider circuitry 514. In some examples, the example data provider circuitry 514 may be instantiated by processor circuitry such as the example processor circuitry 1612 of FIG. 16. For instance, example data provider circuitry 514 may be instantiated by the example general purpose processor circuitry 1700 of FIG. 17 executing machine executable instructions such as that implemented by at least blocks 1512 of FIG. 15. In some examples, the example data provider circuitry 514 may be instantiated by hardware logic circuitry, which may be implemented by an ASIC or the FPGA circuitry 1800 of FIG. 18 structured to perform operations corresponding to the machine readable instructions. Additionally or alternatively, the example data provider circuitry 514 may be instantiated by any other combination of hardware, software, and/or firmware. For example, the example data provider circuitry 514 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example telepresence circuitry 408 produces a new image for each user using a plurality of images representing a single moment in time for all users. A new image for an example user 402A includes the other users 402B, 402C, and 402D within an example shared environment rather than a variety of physical backgrounds. Within the image, the users 402 are relit to appear under the same light source. Additionally, the users 402 are placed within the example shared environment at the specified distance and specified orientation relative to each other. As communication continues and new images are provided by the camera arrays 404, the example telepresence produced additional new images. The new images compose frames of video that are sent to the displays 410. In doing so, the example telepresence circuitry 408 enables realism, directionality and social context in the communication between users 402.

Figure 6:
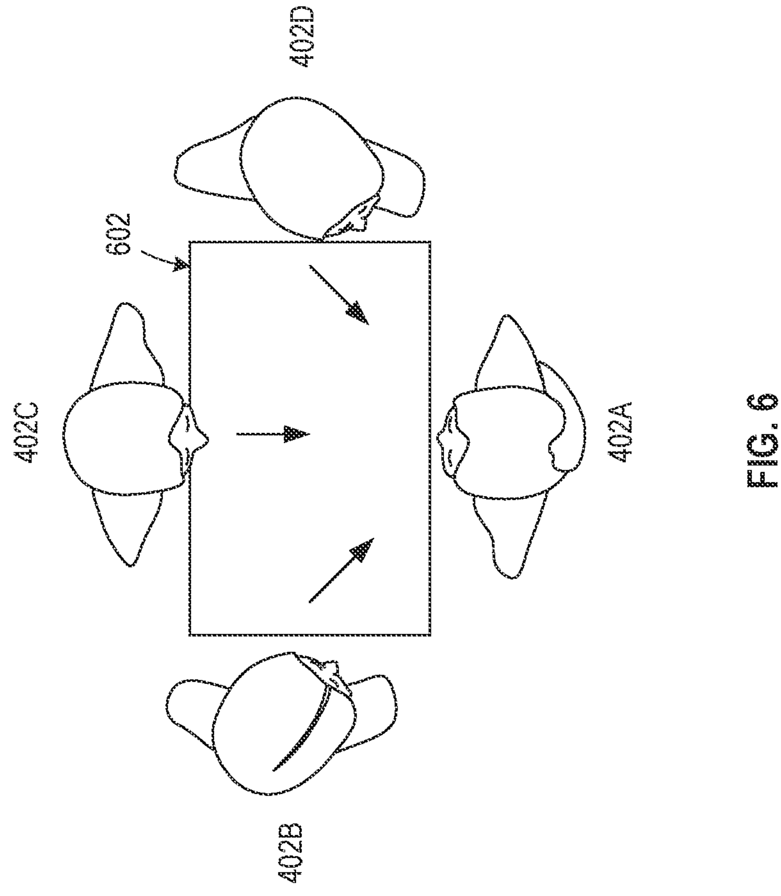
FIG. 6 is an illustrative example of the shared environment data of FIG. 5.

FIG. 6 is an illustrative example of the shared environment data of FIG. 5. The illustrative example includes users 402 and a table 602.

The table 602 of FIG. 6 represents a shared location where the users 402 communicate. In the illustrative example of FIG. 6, the table 602 is a rectangle and one example user is seated at each side. In examples with a different number of users 402, the shape and/or size of the table 602 may change so that the users 402 remain seated evenly around it.

The illustrative example of FIG. 6 includes a white background, for simplicity. In some examples, the table 602 and users 402 may be placed within a different background. Example different backgrounds include but are not limited to a conference room, a classroom, a dining room, etc.

The example telepresence circuitry 408 produces images in which the position of the users 402 around the table 602 remains constant, allowing for directionality and social context to be used during communication between users 402. For example, user 402A is speaking in the illustrative example of FIG. 6. User 402A is seated to the right of user 402B, and therefore appears on the right side of the display 410B. As a result, user 402B may wish to turn their head to the right to make eye contact with user 402A or show attentiveness when user 402A speaks. The head movement of user 402B is represented as an arrow in FIG. 6 and is reflected in the shared environment, enabling all users 402 to see that user 402B is looking at user 402A. Similarly, all users 402 can see that user 402C is looking directly at user 402A, and that user 402D has their head turned to the left to look at user 402A.

Figure 7:
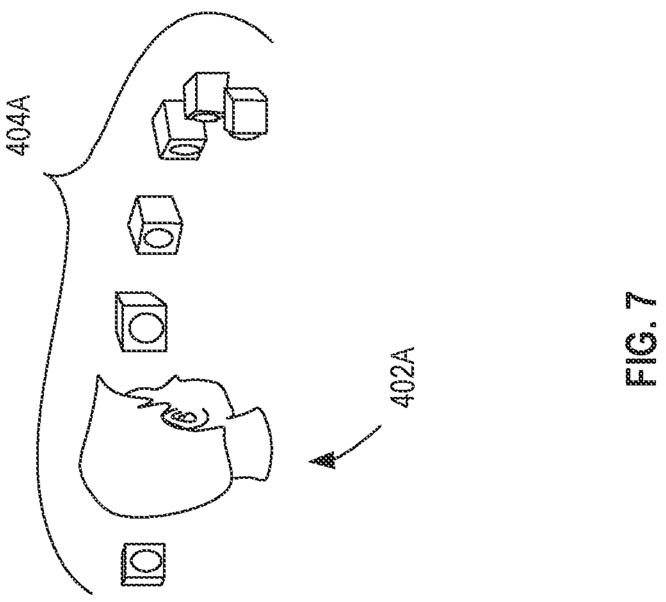
FIG. 7 is an illustrative example of the camera array of FIG. 4.

FIG. 7 is an illustrative example of the camera array of FIG. 4. The illustrative example includes an example user 402A and their respective camera array 404A.

The camera array 404A includes a plurality of cameras positioned in a semi-circular or parabolic fashion. The plurality of cameras capture a subset of the user 402A's light field from a plurality of images. The camera array 404A may be in any location in which the plurality of images capture the user 402A's head. In some examples, the camera array 404A may additionally capture other components of user 402A's body such as their arms or torso. In the example illustration of FIG. 7, the camera array 404A is placed within a proximity to the user 402A. In some examples, the camera array 404A may be placed at any location. Furthermore, the camera array 404A location may be below the display 410A, above the display 410A, or to the side of the display 410A.

The camera array 404A uses multiple copies of the same type of camera for visual consistency between images. In some examples, the plurality of cameras may be integrated into a singular device to implement the camera array 404A. In other examples, the camera array 404A may be implemented by a plurality of independent cameras.

Figures 8, 9:
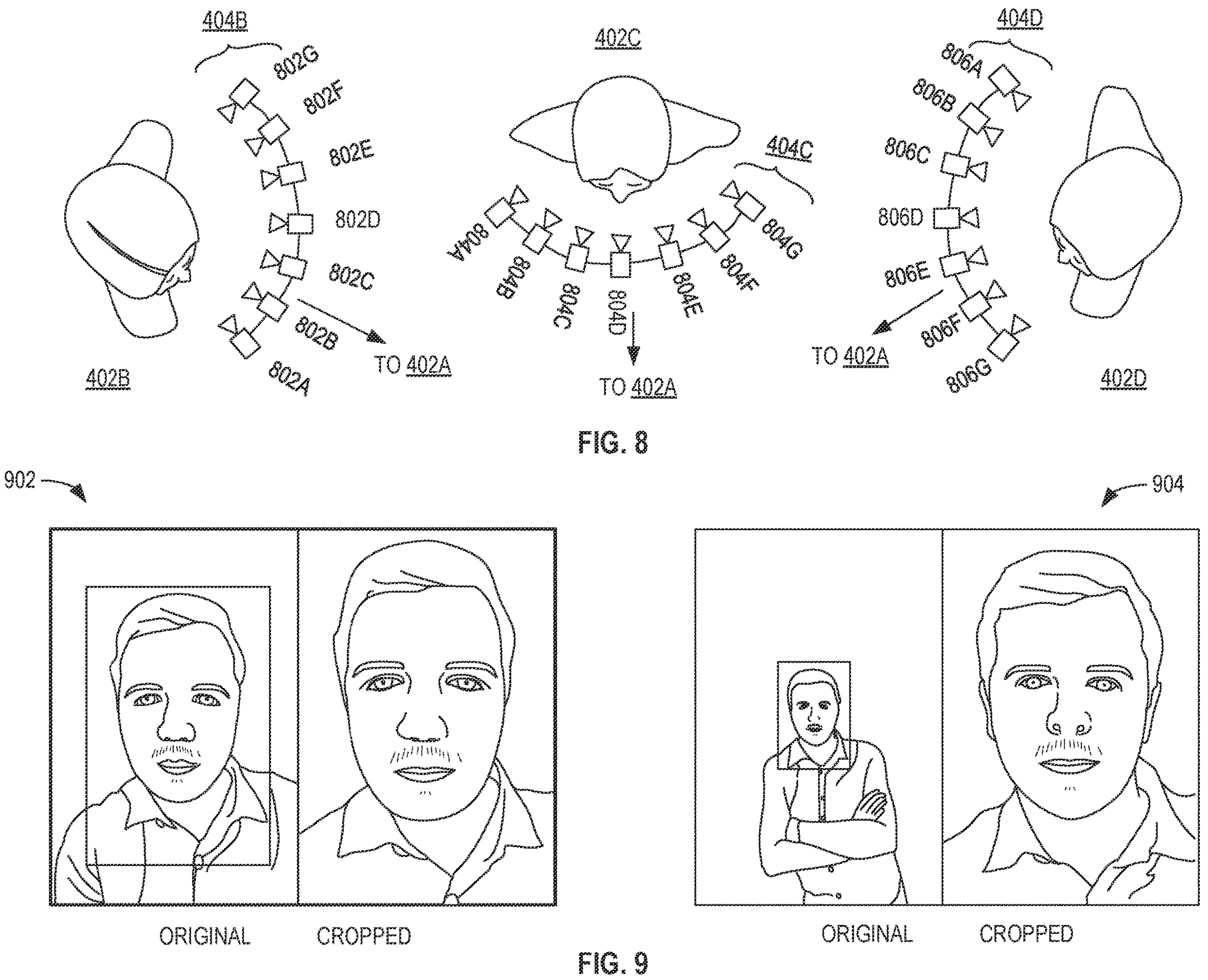
FIG. 8 is an illustrative example of the view constructor circuitry of FIG. 5.
FIG. 9 is an illustrative example of the social view synthesis circuitry of FIG. 5.

FIG. 8 is an illustrative example of the view constructor of FIG. 5. The first illustrative example includes user 402B, camera array 404B, user 402C, camera array 404C, user 402D, and camera array 404C. In the illustrative example, camera array 404B is implemented by a first plurality of cameras 802A-802H, camera array 404C is implemented by a second plurality of cameras 804A-804H, and camera array 404D is implemented by a third plurality of cameras 806A-806H.

The example view constructor circuitry 512 use video feeds of specific cameras to construct a new image with users 402 in a specified location. The example view constructor circuitry 512 determines the specified location to maintain a relative orientation amongst users 402 within the shared environment. For example, the illustrative example of FIG. 8 employs the same example shared environment of FIG. 6, in which the user 402B is seated to the left of user 402A, user 402C is seated directly across from user 402A, and user 402D is seated to the right of user 402A. Therefore, the new image constructed by example view constructor circuitry 512 may use the video feed of cameras 802B, 804D, and 806F to generate a new image for user 402A. The example view constructor circuitry 512 may use additional cameras adjacent to cameras 802B, 804D, and 806F to construct the new image. The specific cameras used to create a new image may depend on the position and number of users 402 within the shared environment.

When user 402A speaks, user 402B looks to their right, user 402C looks straightforward, and user 402D looks to their left, as indicated previously in FIG. 6. This results in user 402B looking towards camera 802B, user 402C looking towards camera 804D, and user 402D looking towards camera 806F. Therefore, user 402A sees an image in which all other users 402 are looking directly at user 402A. Similarly, different cameras in the camera arrays 404 are used by the example social view synthesis circuitry 510 so that all users 402 can see one another look at user 402A. In this fashion, directionality and social context is enabled in telepresence communication between the users 402.

FIG. 9 is an illustrative example of the social view synthesis circuitry of FIG. 5. The illustrative example includes a first drawing 902 and a second drawing 904.

The first drawing 902 of FIG. 9 represents a photograph of an individual. The photograph represented by the first drawing 902 is captured with a camera at an estimated distance of 30 cm from the individual. Similarly, the distance between an example user 402A and their respective camera array 404A may be equal to or near 30 cm. Photographs or video captured at close distances to the subject, such as the image represented by the first drawing 902 and by users 402 of the example system 400, may experience a distortion which causes the subject to appear unrealistic. In some examples, the distortion represented in the first drawing 902 is referred to as selfie distortion.

The second drawing 904 of FIG. 9 represents a different photograph of the same individual shown in the first drawing 902. The different photograph shown in the second drawing 904 is captured with a camera at an estimated distance of 80 cm from the individual. Similarly, 80 cm may be equal to or near the distance between a first user 402A and a second user 402B within the shared environment of FIG. 6. Photographs or video captured at farther distances may avoid or mitigate selfie distortion, resulting in a more realistic representation of the subject.

The example social view synthesis circuitry 510 creates user representations in which images are reprojected to the show users 402 at a specified distance. The example social view synthesis circuitry 510 specifies the distance to be far enough away from the camera's perspective to achieve a realistic representation. In some examples, the example social view synthesis circuitry 510 may additionally specify the distance based on the number of users 402 or the type of shared environment data. In some examples, the user representation creation involves reprojecting a user 402A at a larger distance from the camera's perspective than the physical distance between the user 402A and the camera array 404A. In some such examples, the reprojection removes the effects of selfie distortion in the unprocessed video feed.

Figure 10:
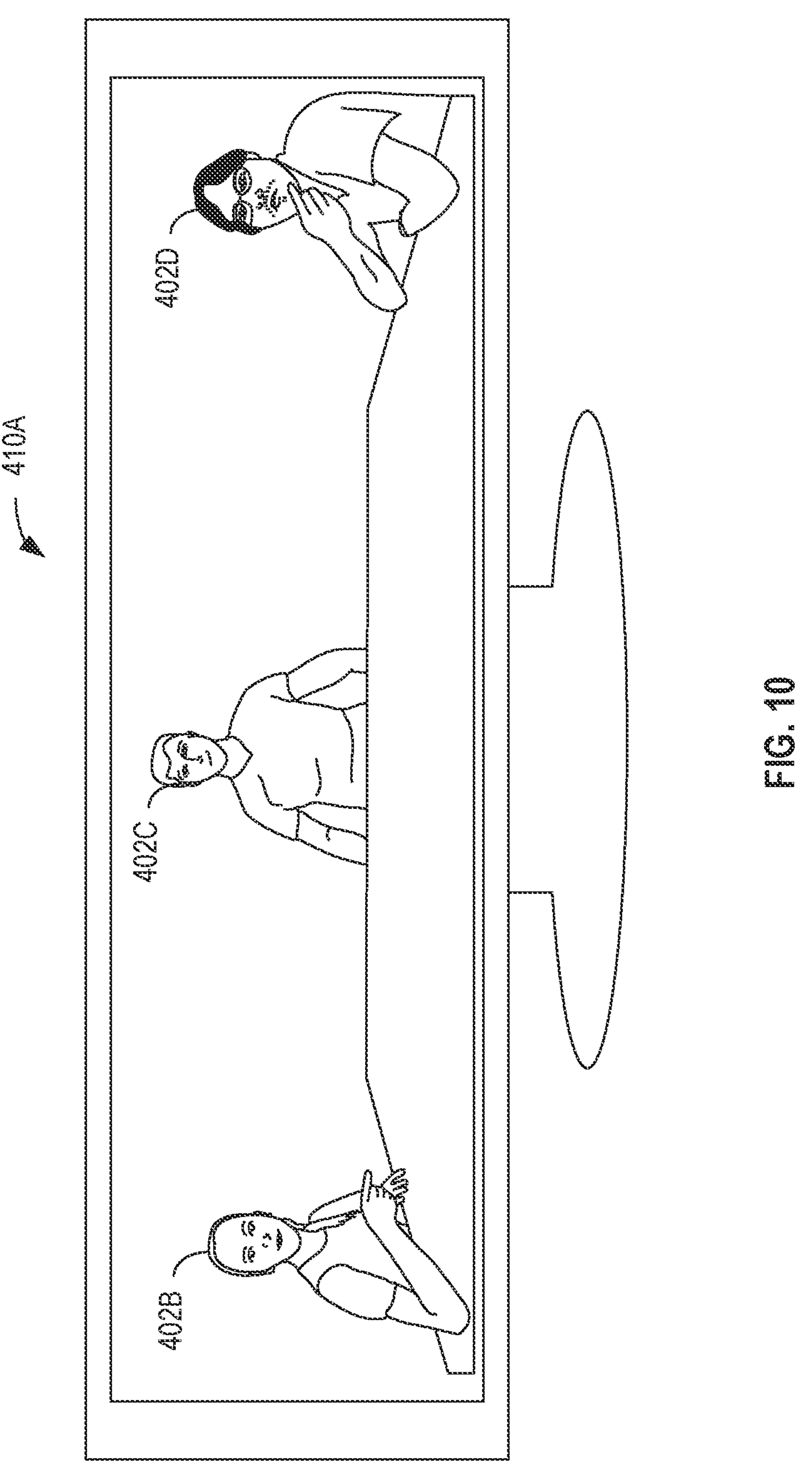
FIG. 10 is an illustrative example of a display of FIG. 4.

FIG. 10 is an illustrative example of a display of FIG. 4. The illustrative example includes the display 410A, user 402B, user 402C, and user 402D.

The display 410A shows the image seen by user 402A. In the illustrative example of FIG. 10, the display 410A is an external monitor with extended width. In some examples, user 402A may employ an external monitor with extended width or multiple external monitors that each have standard width to communicate in the example system 400. In some such examples, the extended width increases the physical distance between users 402 in the view, causing for increased eye movement and change in body position of user 402A. The increased eye movement and change in body position of user 402A may contribute to the sense of realism, directionality, and social context achieved in the example system 400.

In some examples, the user 402B may employs a display 410B implemented without extended width, such as a single standard width monitor or a laptop. In some examples, the user 402C may employ a display 410C implemented as an augmented reality (AR) headset. In some such examples, the AR headset includes a translucent display, which allows for the camera array 404C to capture the eye movement and facial expressions of the user 402C. Furthermore, in such examples, the example view constructor circuitry 512 may provide data describing the current state of the user representations to the data provider circuitry 514, rather than constructing an image. The data may be used by the augmented headset to recreate the facial expressions and pose of the user representations for a particular frame of input video in three dimensions.

The image seen by user 402A includes users 402B, 402C, and 402D. The example telepresence circuitry 408 enables the users 402 to appear evenly lit within the shared environment and at an appropriate distance from the user 402A. Further, the users 402 can all see that users 402B, 402C, and 402D are looking at user 402A, that user 402C is pointing, and that user 402D has their hand on their chin. The final image allows for realism, directionality, and social context when the users 402 communicate.

Figure 11:
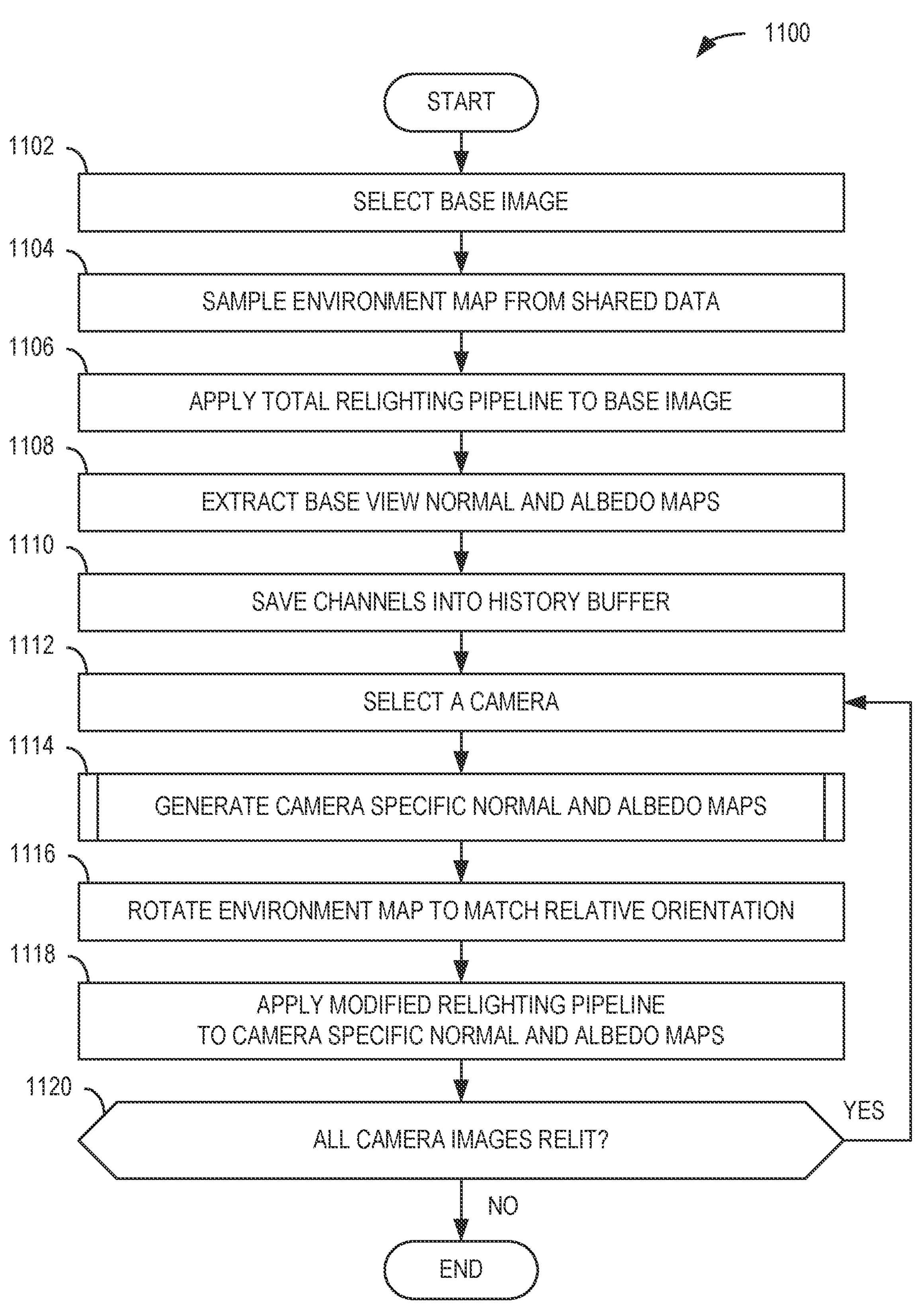
FIG. 11 is a flowchart representative of example machine readable instructions that may be executed by example processor circuitry to implement the multi-view relighter circuitry of FIG. 5.

While an example manner of implementing the example multi-view relighter circuitry 508 of FIG. 5 is illustrated in FIG. 11, one or more of the elements, processes, and/or devices illustrated in FIG. 5 may be combined, divided, re-arranged, omitted, eliminated, and/or implemented in any other way. Further, the example data receiver circuitry 502, example feature identifier circuitry 504, example social view synthesis circuitry 510, example data provider circuitry 514, and/or, more generally, the example telepresence circuitry 408 of FIG. 5, may be implemented by hardware alone or by hardware in combination with software and/or firmware. Thus, for example, any of the example data receiver circuitry 502, example feature identifier circuitry 504, example social view synthesis circuitry 510, example data provider circuitry 514, and/or, more generally, the example telepresence circuitry 408 of FIG. 5, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device (s) (PLD(s)), and/or field programmable logic device(s) (FPLD(s)) such as Field Programmable Gate Arrays (FPGAs). Further still, the example telepresence circuitry 408 of FIG. 5 may include one or more elements, processes, and/or devices in addition to, or instead of, those illustrated in FIG. 11, and/or may include more than one of any or all of the illustrated elements, processes and devices.

A flowchart representative of example hardware logic circuitry, machine readable instructions, hardware implemented state machines, and/or any combination thereof for implementing the example system 400 of FIG. 4 is shown in FIGS. 11, 12, 13, 14, and 15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11, 12, 13, 14, and 15, many other methods of implementing the example system 400 of FIG. 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 11, 12, 13, and 14 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions that may be executed by example processor circuitry to implement the multi-view relighter circuitry of FIG. 5. The example process 1100 describes operations that may be executed to relight an example user 402A in a plurality of images, where the plurality of images all correspond to the same video frame in time. In some examples, the example multi-view relighter circuitry 508 is composed of multiple machines or processors that execute the example process 1100 once for each of the users 402 in parallel. In an alternative example, the example multi-view relighter circuitry 508 executes the example process 1100 once for each of the users 402 sequentially.

The example process 1100 begins when the example multi-view relighter circuitry 508 selects a base image (Block 1102). The base image represents an image from the plurality of images that displays the user 402A in a forward position. In some examples, the base image is captured by the camera at the geometric center of the camera array 404A.

The example multi-view relighter circuitry 508 samples the shared environment light map stored in the example shared environment database 506. (Block 1104). The sample represents the portion of the example base image to be included in the shared environment.

The example multi-view relighter circuitry 508 applies a total relighting pipeline to the base image selected in block 1102. (Block 1106). The total relighting pipeline as used herein involves relighting a single user from a single image. The example multi-view relighter circuitry 508 provides the foreground of the base image, which is identified by the feature identifier circuitry 504, to the total relighting pipeline as an input. The total relighting pipeline as used in block 1106 is described by Pandey, Orts Escolano, Legendre, et. al. *Total relighting: learning to relight portraits for background replacement*. ACM Transactions on Graphics, volume 40, issue 4 (August 2021), article 43.

The example multi-view relighter circuitry 508 extracts base image normal and albedo maps from the total relighting pipeline. (Block 1108). A normal map is a texture map in which the X, Y, and Z coordinates of the surface normal user 402A within the frame are stored as a red, green, and blue (RGB) image. An albedo map is a texture map that describes the color of the user 402A within the frame without lighting effects such as shadows and highlights. The normal and albedo maps are produced during intermediate steps of the total relighting pipeline of block 1106.

The example multi-view relighter circuitry 508 saves the normal and albedo maps in a history buffer for future use in the example process 1100. (Block 1110). The history buffer may be implemented by any type of memory.

The example multi-view relighter circuitry 508 selects a camera from the camera array 404A. (Block 1112). The selected camera excludes the camera used to produce the base image, as the base image has previously been relit in block 1106.

The example multi-view relighter circuitry 508 generates camera specific normal and albedo maps. (Block 1114). The example multi-view relighter circuitry 508 uses spatiotemporal processing and the base image normal and albedo maps to produce the camera specific normal and albedo maps. Block 1114 is explored further in FIG. 12.

The example multi-view relighter circuitry 508 rotates the sampled shared environment light map of block 1104 to match the relative orientation of the selected camera. (Block 1116). The example multi-view relighter circuitry 508 may utilize a 3D modeling software or 3D rendering software to rotate sampled shared environment light map of block 1104.

The example multi-view relighter circuitry 508 applies a modified relighting pipeline to the camera specific normal and albedo maps. The example modified relighting pipeline is a modification of the total relighting pipeline of block 1106. (Block 1118). In some examples, the base image normal and albedo maps may be referred to as a first map set, and the camera specific normal and albedo maps may be referred to as a second map set. In some such examples, the first map set and the second map set may be collectively referred to as a combined map set.

Whereas the total relighting pipeline of block 1106 uses a neural network that accepts the base image and accompanying foreground, the example modified relighting pipeline uses a neural network that accepts the camera specific normal and albedo maps, as well as the sampled and rotated shared environment light data. Because of the modifications, the neural network of the example modified relighting pipeline is less complex and more efficient than the neural network of the total relighting pipeline. The example modified relighting pipeline produces an output of the user 402A relit within the shared environment and from the camera specific view.

The example multi-view relighter circuitry 508 determines if all camera images have been relit. (Block 1120). If all camera images have not been relit, the example process 1100 proceeds to block 1112, where the example multi-view relighter circuitry 508 selects a camera that does not have a relit image. If all camera images have been relit, the example process 1100 ends.

Figure 12:
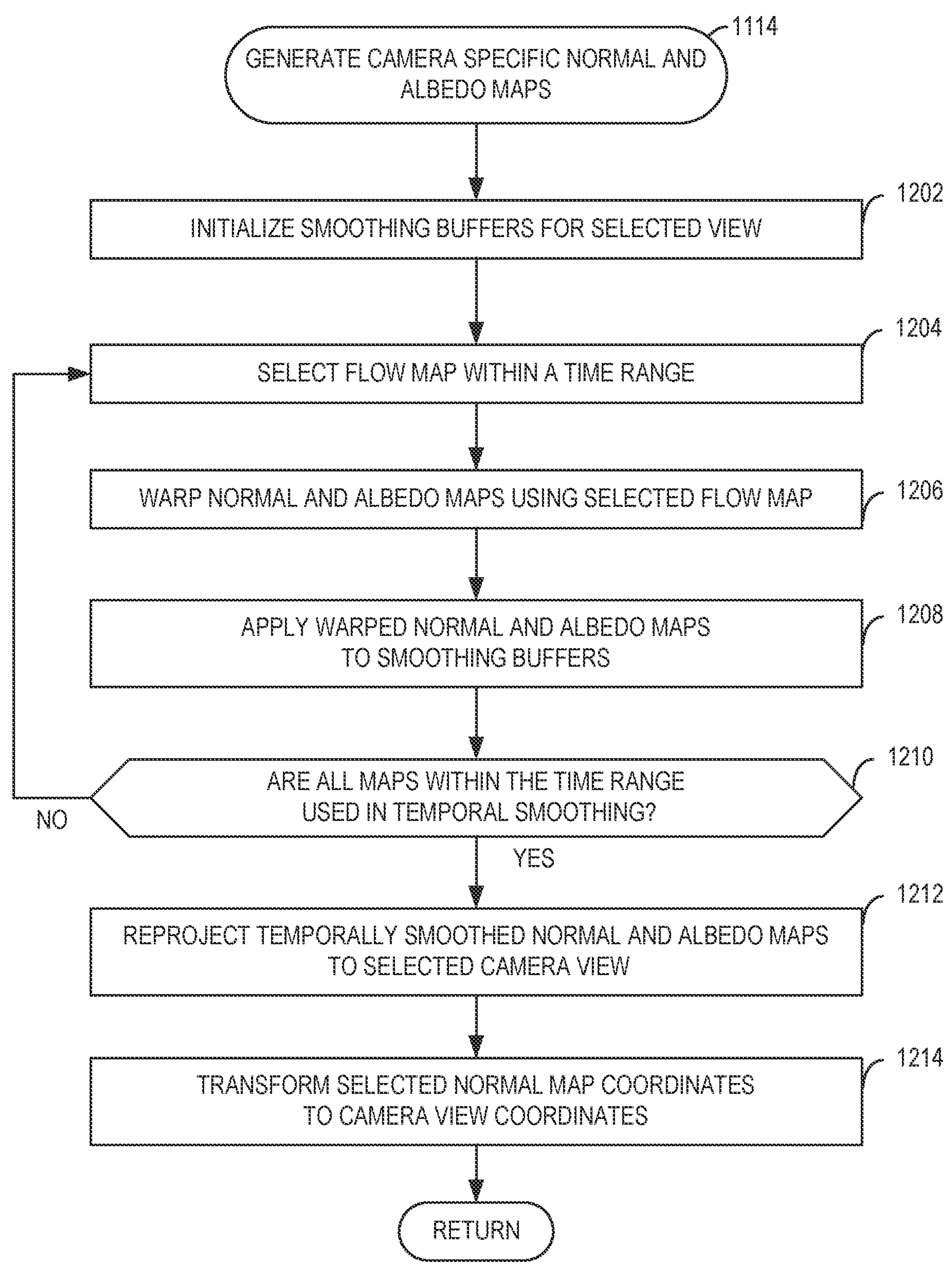
FIG. 12 is a flowchart representative of example machine readable instructions and/or example operations that may be executed by example processor circuitry to generate the camera specific normal and albedo channels of FIG. 11

FIG. 12 is a flowchart representative of example machine readable instructions that may be executed by example processor circuitry to generate the camera specific normal and albedo maps of FIG. 11. The execution of block 1114 begins when the example multi-view relighter circuitry 508 initializes smoothing buffers for the selected view of block 1112. (Block 1202). The example multi-view relighter circuitry 508 initializes a first smoothing buffer for normal maps and a second smoothing buffer for albedo maps.

Both smoothing buffers are data structures that hold a number of maps n. The value n refers to the number of video frames generated by a single camera over a given time range. The time range starts at the current time, when the images of the example process 1100 are captured, and goes backwards in time for a duration. The duration of the time range may be pre-programmed within the example multi-view relighter circuitry 508 or may be determined by the computational resources of the example telepresence circuitry 408.

The example multi-view relighter circuitry 508 selects a temporal flow map within the time range of block 1202. (Block 1204). The temporal flow map is generated by example feature identifier circuitry 504 and describes pixel velocity between video frames.

The example multi-view relighter circuitry 508 warps the normal and albedo maps of block 1108 using the selected temporal flow map. (Block 1206). The resulting normal and albedo maps describe the example user 402A in the current time but are generated from temporal flow maps of a previous time within the time range. As a result, the resulting normal and albedo maps may differ slightly than the normal and albedo maps of block 1108.

The example multi-view relighter circuitry 508 applies the warped normal and albedo maps to the smoothing buffers of block 1202. (Block 1208). The example multi-view relighter circuitry 508 applies the warped normal and albedo maps by first removing the oldest warped maps from the smoothing buffers and adding the warped maps to the smoothing buffers. The example multi-view relighter circuitry 508 then produces new temporally smoothed normal and albedo maps or updates the temporally smoothed normal and albedo maps if they already exist from a previous iteration of block 1208. The new temporally smoothed normal and albedo maps may be generated by any process to temporally smooth images. Processes to temporally smooth images include but are not limited to taking a mean of the smoothing buffers, taking a median of the smoothing buffers, using the smoothing buffers as an input to a neural network, etc.

The example multi-view relighter circuitry 508 determines if all maps within the time range of block 1202 have been used in temporal smoothing. (Block 1210). If all maps within the time range of block 1202 have not been used in temporal smoothing, the execution flow of block 1114 continues at block 1204 where the example multi-view relighter circuitry 508 selects a temporal flow map within the time range that has not been selected previously. If all maps within the time range of block 1202 have been used in temporal smoothing, the execution flow of block 1114 proceeds to block 1212.

The example multi-view relighter circuitry 508 reprojects the temporally smoothed normal and albedo maps to the selected camera view of block 1112. (Block 1212). The resulting normal and albedo maps show the user 402A at the current time with temporal smoothing and from the perspective of the selected camera within the example camera array 404A.

The new normal map of the selected camera image have RGB colors relative to the coordinate system of the base image of block 1102. Therefore, the example multi-view relighter circuitry 508 transforms the new normal map to describe the X, Y, Z coordinate data in the coordinate system of the selected camera image. (Block 1214). The execution of block 1114 ends after block 1204, and the example process 1100 resumes at block 1116.

Figure 13:
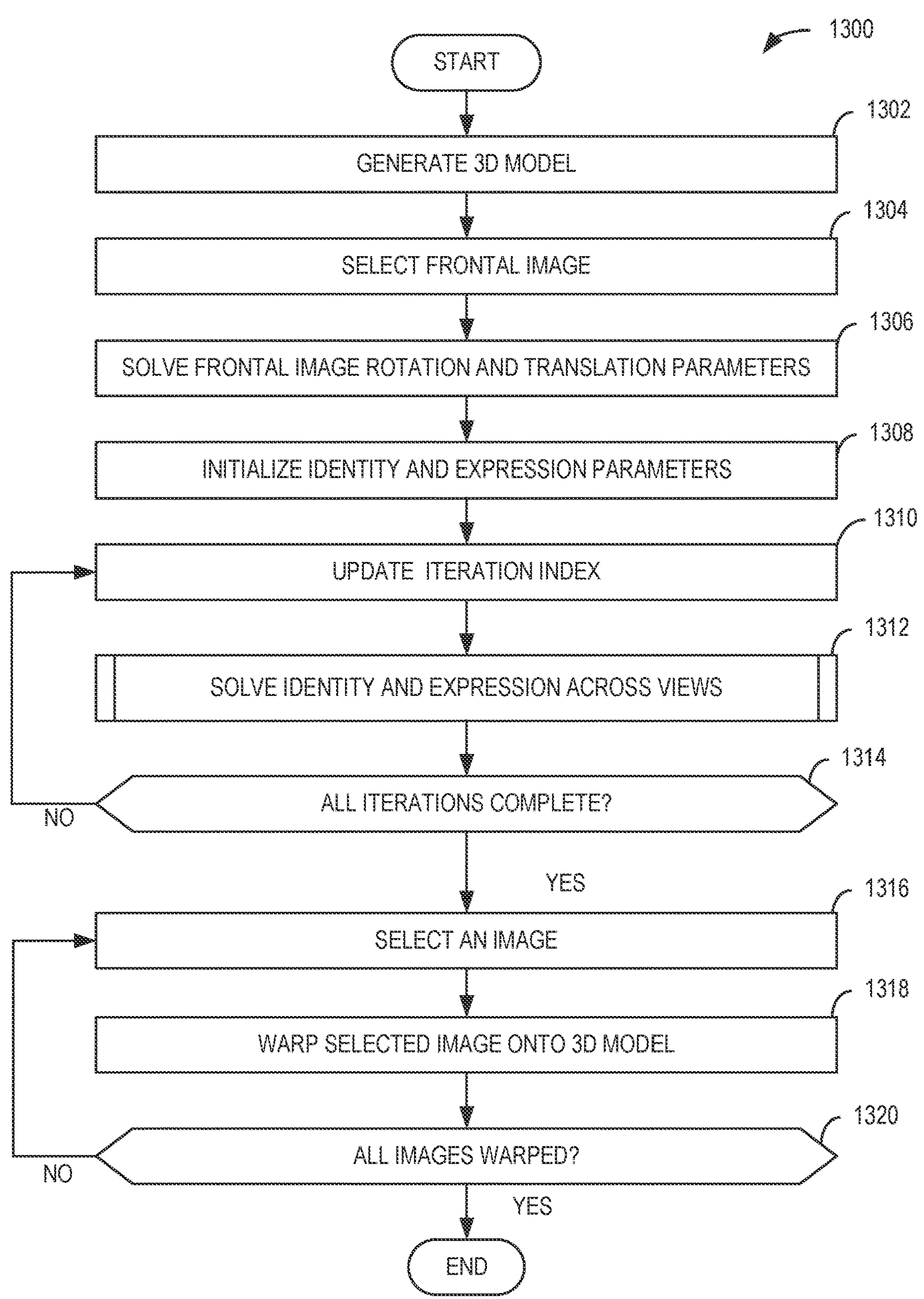
FIG. 13 is a flowchart representative of example machine readable instructions and/or example operations that may be executed by example processor circuitry to implement the social view synthesis circuitry of FIG. 5.

FIG. 13 is a flowchart representative of example machine readable instructions that may be executed by example processor circuitry to implement the social view synthesis circuitry of FIG. 5. The example process 1300 reprojects and undistorts a plurality of images that contain a single user 402A. The example social view synthesis circuitry 510 reprojects and undistorts the plurality of images by warping the plurality of images onto a 3D model that appears at the proper distance and perspective from the camera view. In some examples, the example social view synthesis circuitry 510 is composed of multiple machines or processors that reprojects and undistorts a plurality of images for all users 402 in parallel. In some such examples, an example user 402B may not have a camera array 404B or may choose not to use the camera array 404B. In some such examples, the example social view synthesis circuitry 510 may not generate a 3D model of the example user 402B.

The example process 1300 is a modification of a process to map a 2D image to a 3D model as described in "*Perspective-Aware Manipulation of Portrait Photos*", Fried et al. (SIGGRAPH 2016), herein after referred to as "Fried". The example social view synthesis circuitry 510 provides a stable warping of a plurality of images containing a plurality of views to the 3D model, whereas the process described in Fried warps a single image from a single view to the 3D model. Further improvements to the example process 1300 over the process described in Fried are found in block 1308 and block 1312.

The example process 1300 of FIG. 13 begins when the example social view synthesis circuitry 510 generates a 3D model. (Block 1302). The 3D model is shaped like a human and represents user 402A across the plurality of images. In some examples, the 3D model represents only the components of a user 402A's body that appear in the example shared environment. In the example shared environment described by FIG. 10, the example social view synthesis circuitry 510 may model the user 402A's head, shoulders, arms, and torso. While user 402A does not appear in FIG. 10, the 3D model of user 402A would be used to generate images on display 410B, display 410C, and display 410D, which are not shown in FIG. 10 for simplicity.

The example process 1300 selects a frontal image from a plurality of images containing a user 402A. (Block 1304). A frontal image is an image that contains the user 402A facing forward. In some examples, the frontal image comes from the camera in the geometric center of the example camera array 404A. The plurality of images containing user 402A are provided by the example multi-view relighter circuitry 508, so the foreground is already identified and the user 402A is already lit properly within the shared environment.

The example social view synthesis circuitry 510 solves frontal image rotation and translation parameters. (Block 1306). The rotation and parameters are two types of parameters that describe how coordinates of landmarks in a 2D image of the frontal image are mapped to coordinates on the same landmarks in the 3D model. Landmarks are the parts of an image that uniquely identify a component of the user 402A's body within the image. Example landmarks include but are not limited to the corner of an eye, contours along a chin, etc.

The example social view synthesis circuitry 510 initializes identity and expression parameters. (Block 1308). Rotation, translation, identity, expression, and camera parameters collectively comprise the factors that determine how coordinates of landmarks in a 2D image of the frontal image are mapped to coordinates on the same landmarks in the 3D model. The identity and expression parameters are initialized while keeping the rotation and translation parameters of block 1306 constant. The example social view synthesis circuitry 510 solves for rotation and translation parameters first because solving for identity and expression parameters first may result in a distorted face that over-compensates for an incorrect pose.

The example social view synthesis circuitry 510 solves for parameters in the example process 1300 using camera parameters that pre-calibrated by the camera array 404A. By using pre-calibrated camera parameters, the example social view synthesis circuitry 510 does not estimate the camera parameters in the example process 1300 like the process in Fried does. This results in a reduction in computational resources and increase in efficiency when executing the example process 1300 for a given image, when compared to the process described in Fried.

The example social view synthesis circuitry 510 updates an iteration index. (Block 1310). The iteration index is a value that counts the number of times block 1312 is executed. In some examples, the iteration index starts at 0 or 1 and ends at a value n. The value n describes the number of iterations in which the identity and expression parameters are adjusted for the 3D model of the example user 402A. The value n may be pre-determined within the example system 400 or may be based on the computational resources of the example telepresence circuitry 408.

The example social view synthesis circuitry 510 solves the identity and expression across the plurality of images describing the user 402A. (Block 1312). Each iteration of block 1312 produces new coordinate landmarks on the 3D model, which reduce the Euclidean distance between a given landmark on the 3D model and the same landmark on a 2D image from the plurality of images. A reduction in the Euclidean distance results in a more accurate 3D model and may improve a sense of realism for users 402. Block 1312 is explored further in FIG. 14.

The example social view synthesis circuitry 510 determines if all iterations are complete. (Block 1314). In some examples, the example social view synthesis circuitry 510 makes the determination by checking if the iteration index is greater or equal to the value n. If all iterations are not complete, the example process continues at block 1310 where the example social view synthesis circuitry 510 updates the iteration index. If all iterations are complete, the example process 1300 proceeds to block 1316.

The example social view synthesis circuitry 510 selects an image. (Block 1316). The image is a single image from the plurality of images containing the user 402A.

The example social view synthesis circuitry 510 warps the selected image to fit the components of user 402A's body onto the 3D model. (Block 1318). The warping uses the 3D model landmark coordinates obtained from the solved rotation, translation, identity, and expression parameters. The example social view synthesis circuitry 510 warps the image through a warping procedure described in Fried.

The example social view synthesis circuitry 510 determines if all images have been warped. (Block 1320). If all images have not been warped, the example process 1300 continues at block 1316, where the example social view synthesis circuitry 510 selects an image that has yet to be warped onto the 3D model. If all images have been warped, the example process 1300 ends.

Figure 14:
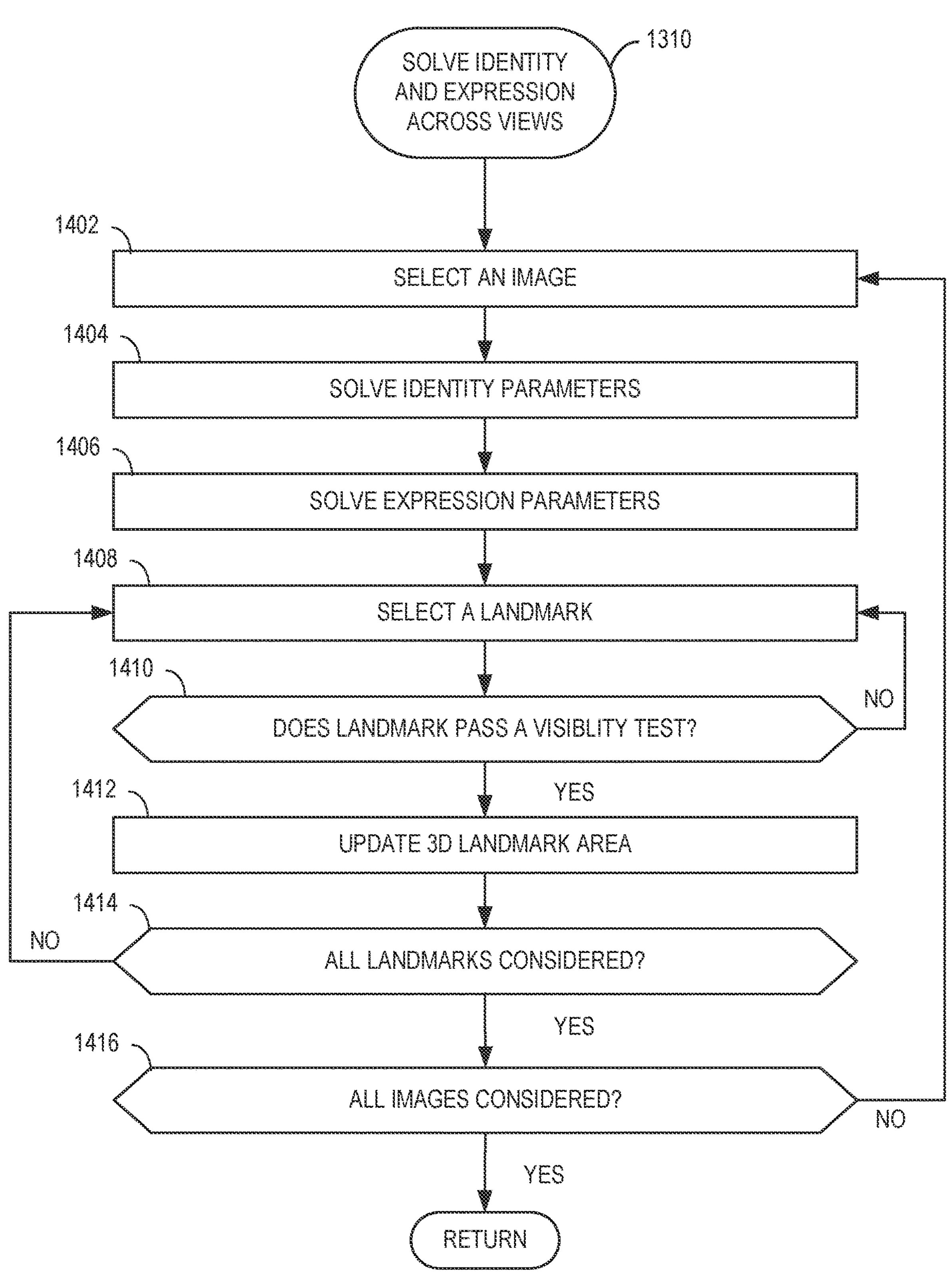
FIG. 14 is a flow chart representative of example machine readable instructions and/or example operations that may be executed by example processor circuitry to solve the identity and expression parameters of FIG. 13.

FIG. 14 is a flow chart representative of example machine readable instructions that may be executed by example processor circuitry to solve the identity and expression parameters of FIG. 13. Specifically, FIG. 14 describes how the example social view synthesis circuitry 510 implements block 1312.

The example social view synthesis circuitry 510 selects an image. (Block 1402). The image is one of a plurality of images describing the example user 402A from a plurality of views.

The example social view synthesis circuitry 510 solves identity parameters. (Block 1404). The identity parameters influence how the coordinates of a given landmark on the frontal view of block 1304 map to the coordinates of the same landmark on the 3D model. The example social view synthesis circuitry 510 solves identity parameters while keeping the rotation, translation, and camera parameters constant. Furthermore, the identity parameters are solved using the most recent expression values.

The example social view synthesis circuitry 510 solves expression parameters. (Block 1406). The expression parameters influence how the coordinates of a given landmark on the 2D image of the frontal image of block 1408 map to the coordinates of the same landmark on the 3D model. The example social view synthesis circuitry 510 solves expression parameters while keeping the rotation, translation, and camera parameters constant. Furthermore, the expression parameters are solved using the most recent identity values.

The example social view synthesis circuitry 510 selects a landmark. (Block 1408). The landmark may be any landmark identified in the selected image.

The example social view synthesis circuitry 510 determines if the selected landmark passes a visibility test (Block 1410). The example social view synthesis circuitry 510 uses the visibility test to create user representations at specified perspectives for the users 402. To pass the visibility test and be included in a specified perspective, a landmark is required to be visible from the perspective of the selected image. In some examples, some landmarks may be occluded within a given selected image due to the various views the images are captured from. For example, the left eye of a user 402A looking to their left may not be visible from an image captured by the rightmost camera in the camera array 404A. In some such examples, the landmarks describing the left eye would fail the visibility test when the image of block 1402 includes a view from the rightmost camera in the camera array 404A.

If the selected landmark is visible from the perspective of the selected image, the coordinates of the user representation representing the selected landmark are updated. (Block 1412). The coordinates are updated using the solved identity parameters of block 1404 and expression parameters of block 1406. If the selected landmark is not visible from the perspective of the selected image, the execution flow of block 1310 proceeds to block 1414.

The example social view synthesis circuitry 510 determines if all landmarks have been considered (block 1414). If all landmarks have not been considered, the execution flow of block 1310 continues at block 1408 where the example social view synthesis circuitry 510 selects a landmark that has not been selected previously. If all landmarks have been considered, the example social view synthesis circuitry 510 proceed to block 1416.

The example social view synthesis circuitry 510 determines if all images have been considered. (Block 1416). If all images have not been considered, the execution flow of block 1310 continues at block 1402 where the example social view synthesis circuitry 510 selects an image that has not been selected previously. If all images have been considered, the execution flow of block 1310 ends.

Figure 15:
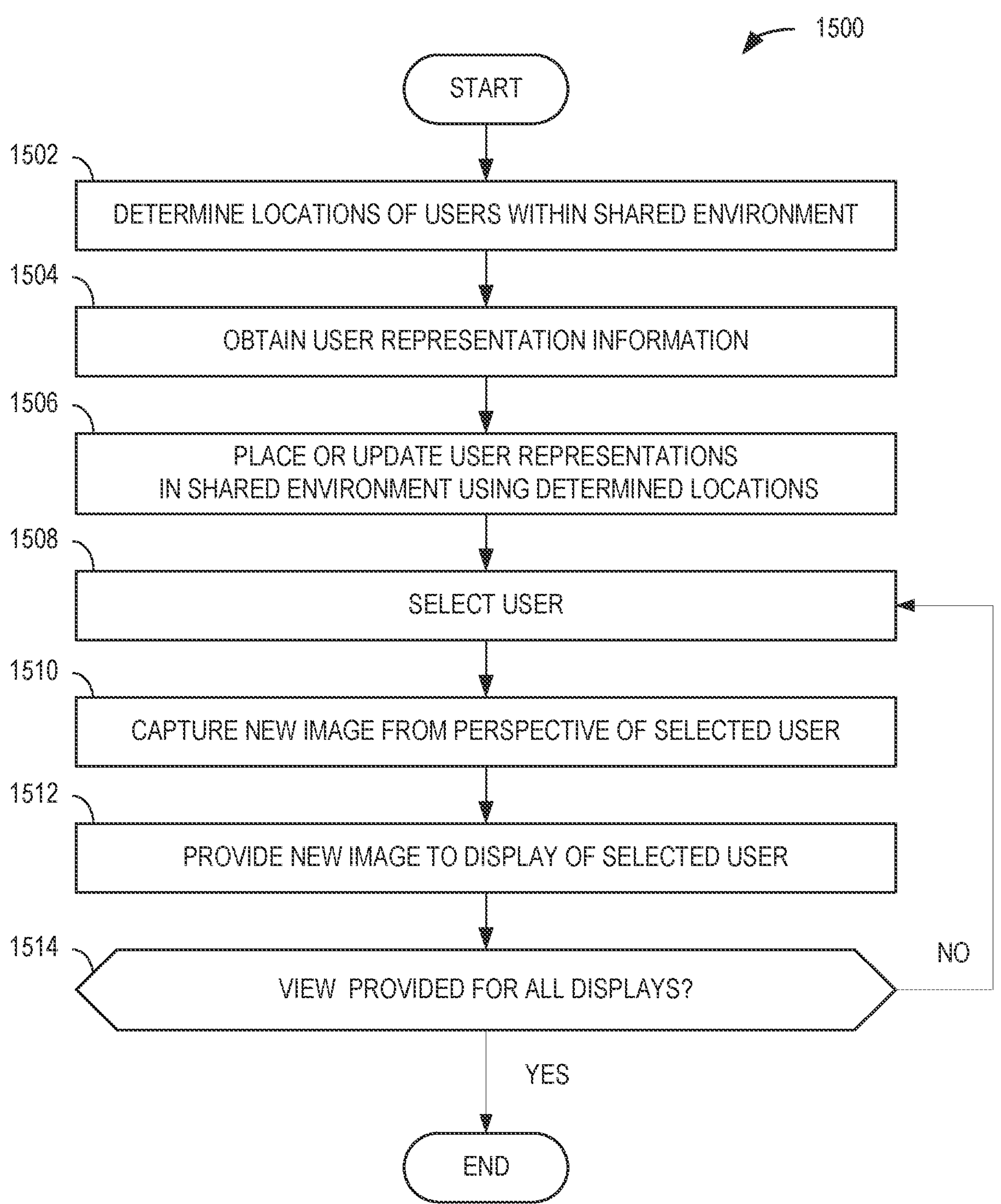
FIG. 15 is a block diagram of an example processing platform including processor circuitry structured to execute the example machine readable instructions to construct and provide a new image to a display.

FIG. 15 is a block diagram of an example processing platform including processor circuitry structured to execute the example machine readable instructions to construct and provide new images to displays. The example process 1500 may be repeatedly executed by the example telepresence circuitry 408 to produce multiple images, where the images represent frames of a video. Furthermore, in some examples, the example process 1500 may be repeatedly executed by multiple machines or processors that in parallel to produce a video for each of the users 402. The example process 1500 begins when the example view constructor circuitry 512 determines the locations of the users 402 within the shared environment. (Block 1502).

The locations of the users 402 are based on the shared environment database 506 and the number of users 402. While the orientation and facial expression of the users 402 may change, the locations of the users 402 remains constant while the users 402 communicate with one another. For example, if the example view constructor circuitry 512 used data from the example shared environment light map of FIG. 6, the four users 402 would stay located at a square table during the course of their communication. Furthermore, user 402A would stay located to the left of user 402D, user 402B would stay located to the left of user 402A, user 402C would stay located to the left of user 402B, and user 402D would stay located to the left of user 402C.

The example view constructor circuitry 512 obtains current information describing the user representations of the users 402 (Block 1504). The user representations are created by the example social view synthesis circuitry 510 and show the users 402 from a multitude of views. The current information describing the user representation may describe the pose, orientation, and facial expression of each user. The pose, orientation, and facial expression of the user representation may change as the users 402 communicate and new images are warped onto the model.

The example view constructor circuitry 512 places or updates the user representations in the shared environment at their determined locations. (Block 1506). In some examples where the user representation is a 3D model, example view constructor circuitry 512 may move parts of the 3D model such as an arm or torso to update the user representation. In other examples where the user representation is a two dimensional image, the example view synthesis circuitry 512 may not move a 3D model. In some such examples, using a two dimensional image as a user representation may increase the rendering efficiency of the example display 410A. The example view constructor circuitry 512 may use a 3D rendering or 3D modeling software and parameters from the example shared environment database 506 to place the user representations in the shared environment.

The example view constructor circuitry 512 selects an example user 402A to capture an image for. (Block 1508). The example view constructor circuitry 512 then captures a new image from the perspective of the selected user 402A. (Block 1510). In some examples, the example view constructor circuitry 512 may use a 3D rendering or 3D modeling software and parameters from the example shared environment database 506 to capture the new image. In some examples such as the example image of FIG. the new image does not include any part of the user representation used to represent the selected user 402A. In examples where the user representations are 3D models, the example view constructor circuitry 512 may record data representing the models and shared environment in block 1510. The data may be used by the augmented headset to recreate the facial expressions and pose of the models for a particular frame of input video in 3D.

The example data provider circuitry 514 provides the new image to the selected user 402A via the network 406. (Block 1512). The example data provider circuitry 514 may provide different data based on the display 410A used by the selected user 402A. In some examples, the display 410A is a monitor or laptop, and the example data provider circuitry 514 provides the new image as a frame of a video. In other examples, the display 410C is an augmented reality headset, and the example data provider circuitry 514 may provide data structures representing 3D objects rather than images.

The example data provider circuitry 514 determines if a new image has been generated for all displays 410. (Block 1514). If a new image has not been generated for all displays 410, then the example process 1500 continues at block 1508, where the example social view synthesis circuitry 510 selects an example user 402B whose display 410B does not have a new image. If new images have been generated for all displays 410, the example process 1500 ends.

Figure 16:
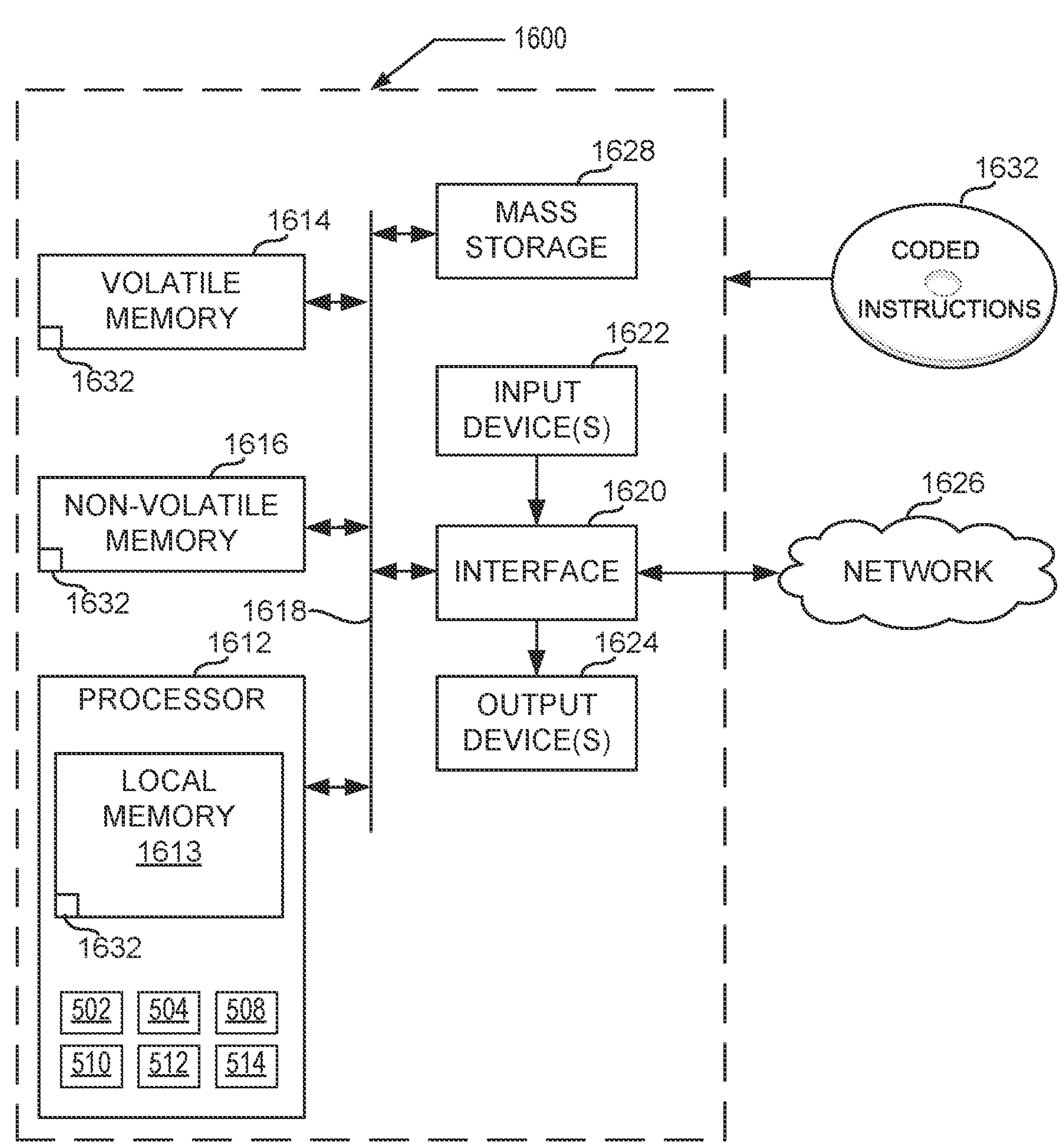
FIG. 16 is a block diagram of an example processing platform including processor circuitry structured to execute the example machine readable instructions to implement the telepresence circuitry of FIG. 5.

FIG. 16 is a block diagram of an example processor platform 1600 structured to execute and/or instantiate the machine readable instructions and/or operations of FIGS. 11, 12, 13, 14, and 15 to implement the example telepresence circuitry 408 of FIG. 4. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements example data receiver circuitry 502, example feature identifier circuitry 504, example multi-view relighter circuitry 508, example social view synthesis circuitry 510, example view constructor circuitry 512, and data provider circuitry 514.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1622 are connected to the interface circuitry 1620. The input device(s) 1622 permit(s) a user to enter data and/or commands into the processor circuitry 1612. The input device(s) 1622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuitry 1620 of the illustrated example. The output device(s) 1624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1632, which may be implemented by the machine readable instructions of FIGS. 11, 12, 13, 14, and 15, may be stored in the mass storage device 1628, in the volatile memory 1614, in the non-volatile memory 1616, and/or on a removable non-transitory computer readable storage medium such as a CD or DVD.

Figure 17:
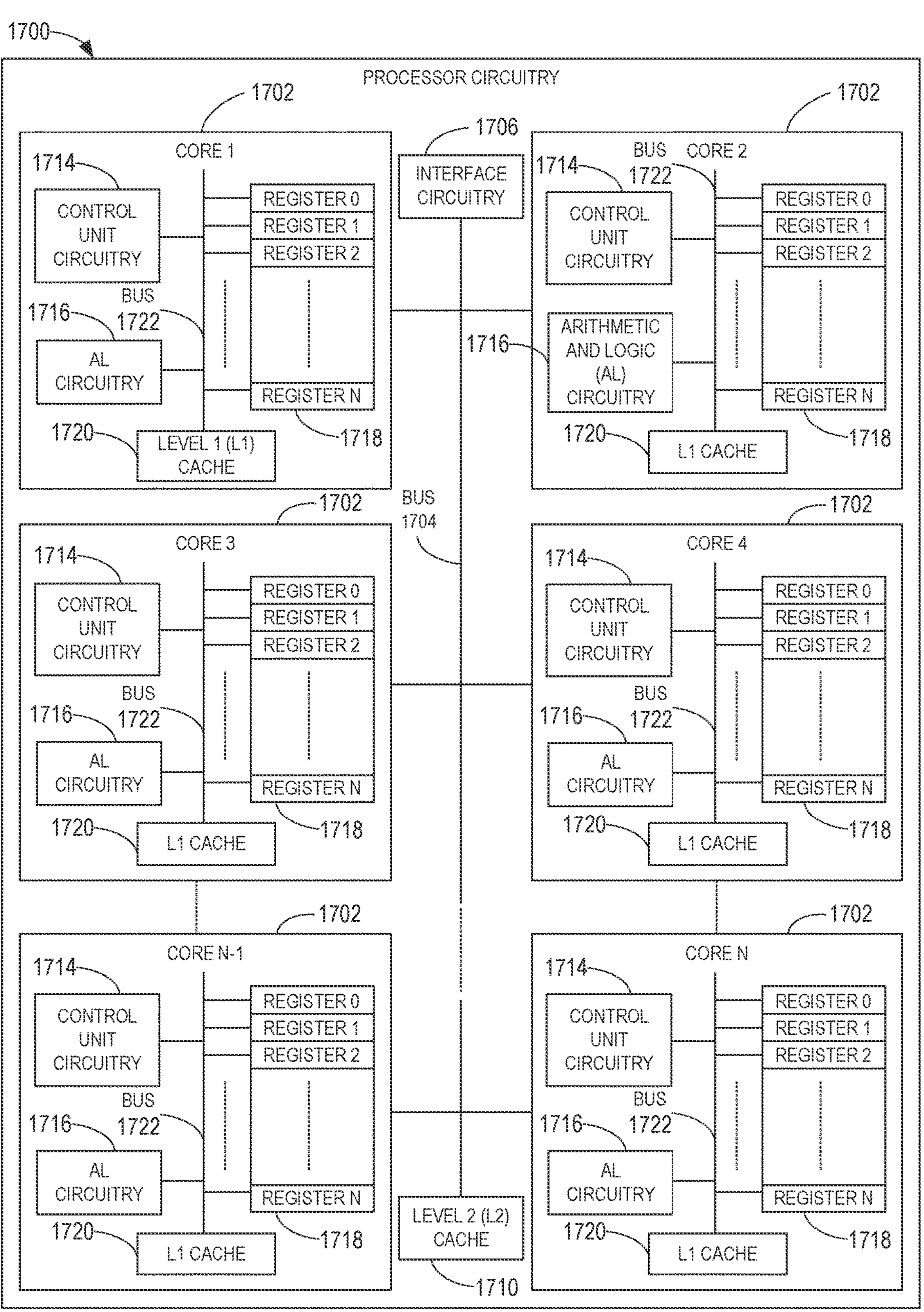
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a general purpose microprocessor 1700. The general purpose microprocessor circuitry 1700 executes some or all of the machine readable instructions of the flowcharts of FIGS. 11-15 to effectively instantiate the example telepresence ciruitry 408 of FIG. 4 as logic circuits to perform the operations corresponding to those machine readable instructions. In some such examples, the example telepresence ciruitry 408 of FIG. 4 is instantiated by the hardware circuits of the microprocessor 1700 in combination with e instructions. For example, the microprocessor 1700 may implement multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowchart of FIGS. 11, 12, 13, 14, and 15.

The cores 1702 may communicate by a first example bus 1704. In some examples, the first bus 1704 may implement a communication bus to effectuate communication associated with one(s) of the cores 1702. For example, the first bus 1704 may implement at least one of an Inter-Integrated Circuit (I2C) bus, a Serial Peripheral Interface (SPI) bus, a PCI bus, or a PCIe bus. Additionally or alternatively, the first bus 1704 may implement any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2_ cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the L1 cache 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry

1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may implement at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
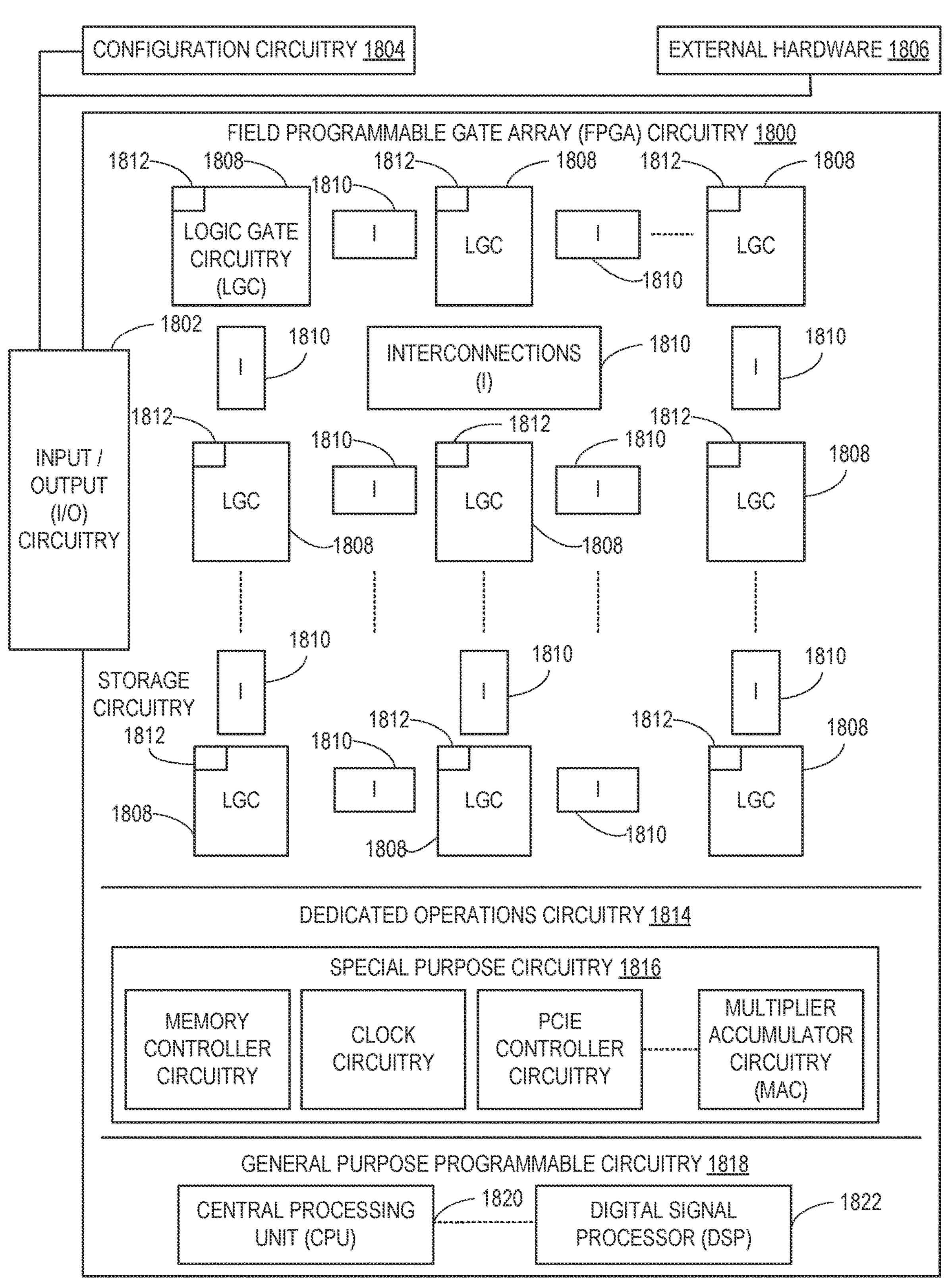
FIG. 18 is a block diagram of another example implementation of the processor circuitry of FIG. 17.

FIG. 18 is a block diagram of another example implementation of the processor circuitry 1612 of FIG. 16. In this example, the processor circuitry 1612 is implemented by FPGA circuitry 1800. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 11, 12, 13, 14, and 15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 11, 12, 13, 14, and 15. In particular, the FPGA 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 11, 12, 13, 14, and 15. As such, the FPGA circuitry 1800 may be structured to effectively instantiate some or all of the machine readable instructions of the flowcharts of FIGS. 11, 12, 13, 14, and 15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIG. 18 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware (e.g., external hardware circuitry) 1806. For example, the configuration circuitry 1804 may implement interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may implement the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and interconnections 1810 are configurable to instantiate one or more operations that may correspond to at least some of the machine readable instructions of FIGS. 11, 12, 13, 14, and 15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIGS. 11, 12, 13, 14, and 15 may be executed by one or more of the cores 1702 of FIG. 17 and a second portion of the machine readable instructions represented by the flowcharts of FIGS. 11, 12, 13, 14, and 15 may be executed by the FPGA circuitry 1800 of FIG. 18, and/or a third portion of the machine readable instructions represented by the flowcharts of FIGS. 11, 12, 13, 14, and 15 may be executed by an ASIC. It should be understood that some or all of the circuitry of FIG. 4 may, thus, be instantiated at the same or different times. Some or all of the circuitry may be instantiated, for example, in one or more threads executing concurrently and/or in series. Moreover, in some examples, some or all of the circuitry of FIG. 4 may be implemented within one or more virtual machines and/or containers executing on the microprocessor.

In some examples, the processor circuitry 1612 of FIG. 16 may be in one or more packages. For example, the processor circuitry 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
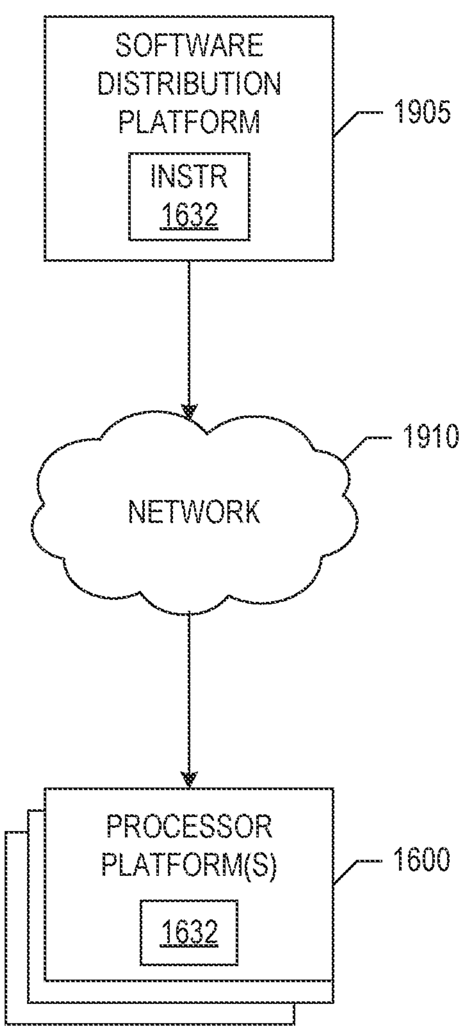
FIG. 19 is a block diagram of an example software distribution platform (e.g., one or more servers) to distribute software (e.g., software corresponding to the example machine readable instructions of FIGS. 11, 12, 13, 14, and 15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions of FIGS. 11, 12, 13, 14, and 15, as described above. The one or more servers of the example software distribution platform 1905 are in communication with a network 1910, which may correspond to any one or more of the Internet and/or any of the network 406 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions of FIGS. 11, 12, 13, 14, and 15, may be downloaded to the example processor platform 1600, which is to execute the machine readable instructions 1632 to implement the example telepresence circuitry 408. In some example, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that provide remote telepresence communication between users that is realistic, directional, and allows for social context. Disclosed systems, methods, apparatus, and articles of manufacture improve the efficiency of using a computing device by generating realistic and properly lit user representations, and placing the user representations at specified locations within a shared environment to generate specified views for the users. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to provide remote telepresence communication are disclosed herein. Further examples and combinations thereof include the following.

Example 1 includes an apparatus to provide remote telepresence communication comprising interface circuitry, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations, or the third operations to instantiate feature identifier circuitry to identify features from a plurality of images, the plurality of images representing a first user and a second user, social view synthesis circuitry to create a first representation of the first user and a second representation of the second user, the representations created using the plurality of images, the representations representing the respective users at specified distances and specified perspectives from a viewer, and view constructor circuitry to construct a first image, the first image to include the second representation at a specified location within a shared environment, the first image to be presented on a first display.

Example 2 includes the apparatus of example 1, wherein the view constructor circuitry is to construct a second image, the second image including the first representation at a specified location within the shared environment, the second image to be presented on a second display different from the first display.

Example 3 includes the apparatus of example 1, wherein the plurality of images is a first plurality of images, the social view synthesis circuitry is to update the representations based on a second plurality of images, and the view constructor circuitry is to construct a second image using the updated second representation, the first image and second image to represent a first frame and second frame of a video.

Example 4 includes the apparatus of example 1, wherein the plurality of images further represents a third user, the social view synthesis circuitry is to further create a third representation of the third user, the third representations created using the plurality of images, the third representations representing the third user at a specified distance and a specified perspectives from a viewer, and the first image further includes the second representation and the third representation at specified locations within the shared environment.

Example 5 includes the apparatus of example 1, further including multi-view relighter circuitry to relight the plurality of images in the shared environment, the relighting based on the features, wherein the features include depth maps, foreground extraction, and temporal flow maps.

Example 6 includes the apparatus of example 5, wherein to relight the plurality of images in a shared environment, the multi-view relighter circuitry is to relight a combined map set, the combined map set a combination of a first map set and a second map set, and rotate a sample of a shared environment light map to have accurate orientation, the shared environment light map to describe the shared environment.

Example 7 includes the apparatus of examples 5 and 6, wherein the first map set includes a first normal map and a first albedo map, the first normal map and a first albedo map generated by a relighting pipeline, wherein the second map set includes a second normal map and a second albedo map, the second normal map and the second albedo map generated based on the temporal flow maps.

Example 8 includes the apparatus of example 1, wherein the plurality of images represent video feeds from a first camera array used by the first user and a second camera array used by the second user.

Example 9 includes the apparatus of example 8, wherein to create the first representation at specified distances, the social view synthesis circuitry is to further generate a user representation, the user representation to include a three dimensional model or a two dimensional image, create an image of the first user at a first distance from the first camera array, the first distance larger than a physical distance between the first user and the first camera array, and reproject the image of the first user at the first distance onto the user representation, the reprojection to remove distortion caused by the physical distance between the first user and the first camera array.

Example 10 includes the apparatus of examples 8 and 9, wherein to create the first model at specified perspectives, the social view synthesis circuitry is further to map coordinates of a landmark in an image representing the first user to coordinates of the landmark on the user representation, the image in the plurality of images, the mapping in response to a determination that the landmark passes a visibility test.

Example 11 includes the apparatus of example 1, wherein the first display is a laptop screen, one or more computer monitors, or an augmented reality headset.

Example 12 includes at least one non-transitory machine readable medium comprising instructions that, when executed, cause at least one processor to at least identify features from a plurality of images, the plurality of images representing a first user and a second user, create a first representation of the first user and a second representation of the second user, the representation s created using the plurality of images, the representation s representing the respective users at specified distances and specified perspectives from a viewer, and construct a first image, the first image including the second representation at a specified location within a shared environment, the first image to be presented on a first display.

Example 13 includes the at least one non-transitory machine-readable medium of example 12, wherein the instructions, when executed, cause the at least one processor to construct a second image, the second image including the first representation at a specified location within the shared environment, the second image to be presented on a second display different from the first display.

Example 14 includes the at least one non-transitory machine-readable medium of example 12, wherein the plurality of images is a first plurality of images, wherein the instructions, when executed, cause the at least one processor to update the representations based on a second plurality of images, and construct a second image using the updated second representation, the first image and second image to represent a first frame and second frame of a video.

Example 15 includes the at least one non-transitory machine-readable medium of example 12, wherein the plurality of images further represents a third user, the instructions, when executed, cause the at least one processor to create a third representation of the third user, the third representations created using the plurality of images, the third representations representing the third user at a specified distance and a specified perspectives from a viewer, and the first image further includes the second representation and the third representation at specified locations within the shared environment.

Example 16 includes the at least one non-transitory machine-readable medium of example 12, wherein the instructions, when executed, cause the at least one processor to relight the plurality of images in the shared environment, the relighting based on the features, wherein the features include depth maps, foreground extraction, and temporal flow maps.

Example 17 includes the at least one non-transitory machine-readable medium of example 16, wherein to relight the plurality of images in a shared environment, the instructions, when executed, cause the at least one processor to relight a combined map set, the combined map set a combination of a first map set and a second map set, and rotate a sample of a shared environment light map to have accurate orientation, the shared environment light map to describe the shared environment.

Example 18 includes the at least one non-transitory machine-readable medium of examples 16 and 17, wherein the first map set includes a first normal map and a first albedo map, the first normal map and a first albedo map generated by a relighting pipeline, wherein the second map set includes a second normal map and a second albedo map, the second normal map and the second albedo map generated based on the temporal flow maps.

Example 19 includes the at least one non-transitory machine-readable medium of example 12, wherein the plurality of images represent video feeds from a first camera array used by the first user and a second camera array used by the second user.

Example 20 includes the at least one non-transitory machine-readable medium of example 19, wherein to create the first representation at specified distances, the instructions, when executed, cause the at least one processor to generate a user representation, the user representation to include a three dimensional model or a two dimensional image, create an image of the first user at a first distance from the first camera array, the first distance larger than a physical distance between the first user and the first camera array, and reproject the image of the first user at the first distance onto the user representation, the reprojection to remove distortion caused by the physical distance between the first user and the first camera array.

Example 21 includes the at least one non-transitory machine-readable medium of examples 19 and 20, wherein to create the first model at specified perspectives, the instructions, when executed, cause the at least one processor to map coordinates of a landmark in an image representing the first user to coordinates of the landmark on the user representation, the image in the plurality of images, the mapping in response to a determination that the landmark passes a visibility test.

Example 22 includes the at least one non-transitory machine-readable medium of example 12, wherein the first display is a laptop screen, one or more computer monitors, or an augmented reality headset.

Example 23 includes a method to provide remote telepresence communication, the method comprising identifying features from a plurality of images, the plurality of images representing a first user and a second user, creating a first representation of the first user and a second representation of the second user the representation created using the plurality of images, the representation representing the respective users at specified distances and specified perspectives from a viewer, and constructing a first image, the first image to include the second representation at a specified location within a shared environment, the first image to be presented on a first display.

Example 24 includes the method of example 23, further including creating a second image, the second image including the first representation at a specified location within the shared environment, the second image to be presented on a second display different from the first display.

Example 25 includes an apparatus to provide remote telepresence communication, the apparatus comprising means for identifying features from a plurality of images, the plurality of images representing a first user and a second user, means for creating a first representation of the first user and a second representation of the second user, the representations created using the plurality of images, the representations representing the respective users at specified distances and specified perspectives from a viewer, and means for constructing a first image, the first image including the second representation at a specified location within a shared environment, the first image to be presented on a first display.

The following claims are hereby incorporated into this Detailed Description by this reference, with each claim standing on its own as a separate embodiment of the present disclosure. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to provide remote telepresence communication, the apparatus comprising:

interface circuitry;

computer readable instructions; and processor circuitry to be programmed based on the computer readable instructions to:

identify features from a plurality of images, the plurality of images representing a first user and a second user;

combine a first map set with a second map set, the first map set and the second map set corresponding to a first camera within a camera array, the first camera to capture one or more of the plurality of images;

access a rotated light map of a shared environment, the rotation based on an orientation of the first camera within the camera array;

relight the one or more of the plurality of images based on the features, the rotated light map and the combined map set;

create a first representation of the first user and a second representation of the second user, the representations based on the relit one or more of the plurality of images, the representations representing the respective users at specified distances and specified perspectives from a viewer; and construct a first image, the first image to include the second representation at a specified location within a shared environment, the first image to be presented on a first display.

2. The apparatus of claim 1, wherein the processor circuitry is to construct a second image, the second image including the first representation at a specified location within the shared environment, the second image to be presented on a second display different from the first display.

3. The apparatus of claim 1, wherein:

the plurality of images is a first plurality of images; and the processor circuitry is to:

update the representations based on a second plurality of images; and construct a second image based on the updated second representation, the first image and second image to represent a first frame and second frame of a video.

4. The apparatus of claim 1, wherein:

the plurality of images represents a third user; and the processor circuitry is to create a third representation of the third user, the third representations based on the plurality of images, the third representations representing the third user at a specified distance and a specified perspectives from a viewer, the first image including the second representation and the third representation at specified locations within the shared environment.

5. The apparatus of claim 1, wherein the features include depth maps, foreground extraction, and temporal flow maps.

6. The apparatus of claim 5, wherein the first map set includes a first normal map and a first albedo map, the first normal map and a first albedo map generated by a relighting pipeline, wherein the second map set includes a second normal map and a second albedo map, the second normal map and the second albedo map generated based on the temporal flow maps.

7. The apparatus of claim 1, wherein the plurality of images represent video feeds from a first camera array associated with the first user and a second camera array associated with the second user.

8. The apparatus of claim 7, wherein to create the first representation at specified distances, the processor circuitry is to:

generate a user representation, the user representation to include a three dimensional model or a two dimensional image;

create an image of the first user at a first distance from the first camera array, the first distance larger than a physical distance between the first user and the first camera array; and reproject the image of the first user at the first distance onto the user representation, the reprojection to remove distortion caused by the physical distance between the first user and the first camera array.

9. The apparatus of claim 8, wherein to create the first representation at specified perspectives, the processor circuitry is to map coordinates of a landmark in an image representing the first user to coordinates of the landmark on a user representation, the image in the plurality of images, the mapping based on a determination that the landmark passes a visibility test.

10. The apparatus of claim 1, wherein the first display is a laptop screen, one or more computer monitors, or an augmented reality headset.

11. The apparatus of claim 1, wherein the processor circuitry includes one or more of:

at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to machine-readable data, and one or more registers to store a result of the one or more first operations, the machine-readable data in the apparatus;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations.

12. At least one non-transitory machine-readable medium comprising instructions to cause at least one programmable circuit to at least:

identify features from a plurality of images, the plurality of images representing a first user and a second user;

combine a first texture map with a second texture map, the first texture map and the second texture map corresponding to a first camera within a camera array, the first camera to capture one or more of the plurality of images;

access a rotated light map of a shared environment, the rotation based on an orientation of the first camera within the camera array;

relight the one or more of the plurality of images based on the features, the rotated light map and the combined texture map;

create a first representation of the first user and a second representation of the second user, the representations based on the relit one or more of the plurality of images, the representations representing the respective users at specified distances and specified perspectives from a viewer; and construct a first image, the first image including the second representation at a specified location within the shared environment, the first image to be presented on a first display.

13. The at least one non-transitory machine-readable medium of claim 12, wherein the instructions are to cause one or more of the at least one programmable circuit to construct a second image, the second image including the first representation at a specified location within the shared environment, the second image to be presented on a second display different from the first display.

14. The at least one non-transitory machine-readable medium of claim 12, wherein the plurality of images is a first plurality of images, wherein the instructions are to cause one or more of the at least one programmable circuit to:

update the representations based on a second plurality of images; and construct a second image based on the updated second representation, the first image and second image to represent a first frame and second frame of a video.

15. The at least one non-transitory machine-readable medium of claim 12, wherein:

the plurality of images further represents a third user;

the instructions are to cause one or more of the at least one programmable circuit to create a third representation of the third user, the third representations based on the plurality of images, the third representations representing the third user at a specified distance and a specified perspectives from a viewer; and the first image further includes the second representation and the third representation at specified locations within the shared environment.

16. The at least one non-transitory machine-readable medium of claim 12, wherein the features include depth maps, foreground extraction, and temporal flow maps.

17. A method to provide remote telepresence communication, the method comprising:

identifying features from a plurality of images, the plurality of images representing a first user and a second user;

combining a first texture map with a second texture map, the first texture map and the second texture map corresponding to a first camera within a camera array, the first camera to capture one or more of the plurality of images;

accessing a rotated light map of a shared environment, the rotation based on an orientation of the first camera within the camera array;

relighting the one or more of the plurality of images based on the features, the rotated light map and the combined texture map;

creating a first representation of the first user and a second representation of the second user, the representations based on the relit one or more of the plurality of images, the representations representing the respective users at specified distances and specified perspectives from a viewer; and constructing a first image, the first image to include the second representation at a specified location within the shared environment, the first image to be presented on a first display.

18. The method of claim 17, including creating a second image, the second image including the first representation at a specified location within the shared environment, the second image to be presented on a second display different from the first display.

* * * * *